(12) United States Patent
Mead et al.

(10) Patent No.: US 9,037,317 B2
(45) Date of Patent: May 19, 2015

(54) SYSTEM AND METHOD FOR AUTOMATIC DEPENDENT SURVEILLANCE COLLECTION AND ANALYSIS

(75) Inventors: Robert W. Mead, Covington, WA (US); Kelly J. Griswold, Renton, WA (US)

(73) Assignee: The Boeing Company, Chicago, IL (US)

( * ) Notice: Subject to any disclaimer, the term of this patent is extended or adjusted under 35 U.S.C. 154(b) by 1477 days.

(21) Appl. No.: 11/614,756

(22) Filed: Dec. 21, 2006

(65) Prior Publication Data

US 2008/0154448 A1    Jun. 26, 2008

(51) Int. Cl.
| | |
|---|---|
| *G06F 19/00* | (2011.01) |
| *G06Q 50/00* | (2012.01) |
| *G06F 3/0482* | (2013.01) |
| *G08G 5/00* | (2006.01) |
| *H04B 7/185* | (2006.01) |

(52) U.S. Cl.
CPC ............ *G06Q 50/00* (2013.01); *H04B 7/18506* (2013.01); *G06F 3/0482* (2013.01); *G08G 5/0021* (2013.01)

(58) Field of Classification Search
CPC ........... B64D 2045/0075; B64D 47/00; G01C 23/00; G01S 13/9303; G06F 11/3013; G06F 11/3041; G06F 3/00; G06F 3/01; G06F 3/048; G06F 3/0481; G06F 3/0482; G06F 3/0495; G06Q 2240/00; G06Q 50/00; G06Q 50/26; G06Q 99/00; G08G 5/00; G08G 5/004; G08G 5/0013; G08G 5/0017; G08G 5/0021; G08G 5/003; G08G 5/0034; G08G 5/0039; G08G 5/0047; G08G 5/0052; G08G 5/0056; G08G 5/006; G08G 5/0065; G08G 5/0069; G08G 5/0073; G08G 5/0078; G08G 5/0095; G08G 99/00; H04B 7/18506; H04B 7/18508
USPC .......................................................... 701/14
See application file for complete search history.

(56) References Cited

U.S. PATENT DOCUMENTS

| | | | |
|---|---|---|---|
| 6,330,499 | B1 | 12/2001 | Chou et al. |
| 6,567,729 | B2 * | 5/2003 | Betters et al. ................... 701/29 |
| 6,681,158 | B2 | 1/2004 | Griffith |
| 6,816,762 | B2 * | 11/2004 | Hensey et al. .................. 701/35 |

(Continued)

FOREIGN PATENT DOCUMENTS

DE        102004036269        4/2006

OTHER PUBLICATIONS

McConkey, et al., Automatic Dependent Surveillance for Rotorcraft Operations in a Low Altitude, Non-Radar Environment, Final Report, Jul. 9, 1999, published via the NASA website Oct. 12, 2000.*

(Continued)

*Primary Examiner* — Jerrah Edwards
(74) *Attorney, Agent, or Firm* — Patterson + Sheridan, LLP

(57) ABSTRACT

A system and method for collecting and analyzing data generated by at least one mobile platform (such as a train, ship, aircraft or automobile). The system includes a source of at least one user input, and a data interface control module that collects at least one type of data from the mobile platform, based on the user input, with the data related to the operation of the mobile platform. The system also comprises an analysis control module that analyzes the data collected by the data interface control module and generates analysis data based on the user input.

14 Claims, 25 Drawing Sheets

(56) References Cited

U.S. PATENT DOCUMENTS

| | | |
|---|---|---|
| 7,203,688 B2 | 4/2007 | Hopkins |
| 2004/0106404 A1* | 6/2004 | Gould et al. ............... 455/431 |
| 2005/0228558 A1* | 10/2005 | Valette et al. ............... 701/33 |
| 2005/0288831 A1* | 12/2005 | Lusardi et al. ............... 701/3 |
| 2006/0119515 A1 | 6/2006 | Smith |
| 2007/0032921 A1 | 2/2007 | Allen |
| 2007/0200761 A1 | 8/2007 | Smith |
| 2007/0252760 A1 | 11/2007 | Smith et al. |
| 2008/0163093 A1* | 7/2008 | Lorido ............... 715/771 |

OTHER PUBLICATIONS

General Aviation Aircraft Data Communications Analysis Using a Web-Based Tool, 22nd. Dasc. The 22nd. Digital Avionics Systems Conference Proceedings. Mulkerin T; Zernic M, Indianapolis, IN, Oct. 12-16, 2003, Digital Avionics Systems Conference, New York, NY: IEEE, US, 7 pages.

* cited by examiner

| Message Info | Basic Group | Predicted Route Group | Fixed Projected Intent Group | Air Reference Group | Meteorological Group | Intermediate Projected Intent Group | Flight ID Group |
|---|---|---|---|---|---|---|---|
| Flight Number | Latitude | Next Lat | Latitude | True Heading | Wind Speed | Distance | Flight ID |
| Tail Number | Interpreted Lat | Interpreted Next Lat | Interpreted Lat | Mach Speed | Wind Direction | True Track | Message Part |
| MessageId | Longitude | Next Long | Longitude | Vertical Rate | Temperature | Altitude | |
| Etamsid | Interpreted Long | Interpreted Next Long | Interpreted Long | Message Part | Message Part | Projected Time | |
| Msg Date | Altitude | Next Altitude | Altitude | | | Message Part | |
| Full Msg Text | Timestamp | Next ETA | Projected Time | | | | |
| Msg Hex Part | FOM | Next Plus 1 Lat | Message Part | | | | |
| Event Type | Emergency | Interpreted Next Plus 1 Lat | | | | | |
| Interpreted Date/Time | Message Part | Next Plus 1 Long | | | | | |
| | | Interpreted Next Plus 1 Long | | | | | |
| | | Next Plus 1 Altitude | | | | | |
| | | Next Plus 1 ETA | | | | | |
| | | Message Part | | | | | |

| | A | B | C | D | E |
|---|---|---|---|---|---|
| 1 | | | | | |
| 2 | | ETO Accuracy Statistics (cumulative) | | | |
| 3 | | | | | |
| 4 | Waypoint | ATA | FL | Min ETO diff | Max ETO diff |
| 5 | A01 | 0 | 0 | 0 | 0 |
| 6 | A02 | 16 | 4500 | 5 | 5 |
| 7 | A03 | 28 | 6000 | 8 | 5 |
| 8 | A04 | 38 | 10000 | 10 | 5 |
| 9 | A05 | 48 | 18000 | 3 | 9 |
| 10 | A06 | 53 | 21000 | 4 | 5 |
| 11 | A07 | 57 | 27000 | 4 | 5 |
| 12 | A08 | 100 | 38000 | 3 | 4 |
| 13 | A09 | 120 | 38000 | 3 | 4 |
| 14 | A10 | 150 | 38000 | 5 | 6 |
| 15 | | | | | |

206 — (row 1 indicator)
86a — (row 10 indicator)

SYSTEM AND METHOD FOR AUTOMATIC DEPENDENT SURVEILLANCE COLLECTION AND ANALYSIS

FIELD

The present disclosure relates generally to mobile platforms, and more particularly to a system and method for collecting and analyzing automatic dependent surveillance data from the mobile platforms.

BACKGROUND

The statements in this section merely provide background information related to the present disclosure and may not constitute prior art.

Many mobile platforms (such as trains, ships, aircraft and automobiles) communicate and exchange information directly between the mobile platform and a central control station over a data link. One specific type of information that is communicated over the data link is Automatic Dependent Surveillance-Contract (ADS-C) data, also sometimes referred to as ADS-A. ADS-C uses the various systems aboard the aircraft to provide aircraft identification, position, velocity, intent, and meteorological data. This data can be transmitted to the Air Navigation Service Provider (ANSP), airline operations control center or other users for the purposes of establishing and predicting aircraft position and gathering data on the air traffic environment (e.g. current meteorological information). ADS-C reports are generated in response to commands, called contract requests, issued by the collecting system. The contract request identifies the types of information and the conditions under which reports are to be transmitted from the aircraft back to the ground.

ADS-C is historically collected by only ANSPs or airline operation control centers. For the collecting system to establish contract requests with a specific flight, the aircraft has to have its ADS-C system turned on and within communications range to accept and manage the contracts for the collecting system. The aircraft does not "store" any of the contract requests or corresponding information, so ADS-C data collection cannot be "scheduled" by the collecting system for activation sometime in the future. Rather, the contract requests must be actively managed by the collecting system, requiring the collecting system to actively monitor the flight and formulate contract requests in real-time as the flight progresses.

As most potential collecting systems neither have the required addressing data to request ADS-C data from the aircraft, nor the required knowledge of the location of the aircraft at any given time to request the data, these potential collecting systems have to work with the ANSPs or airlines to collect the necessary data needed for their analysis, security monitoring, or other purposes. This situation normally leaves the potential other users of ADS-C data unable to gain access to the data they require, since doing so requires system changes to the ANSP or airline ground systems to collect data types and collect quantities of data they typically have not been provisioned to collect. In addition, the collection of this data may impose unacceptable workload increases and tasking changes on the operational staff utilizing and managing the ANSP systems as they are asked to execute tasks outside their normal duties to oversee the additional data collection.

As a result, the potential users of the ADS-C data are unable to collect the data they need. Other users, such as security systems, data fusion systems, and analytical systems not directly associated with an operational ANSP or airline, are also unable to tap the data available through the ADS-C functions on existing aircraft. In addition, various other similar data types and functions generated during the operation of the mobile platform, such as Airline Operational Control (AOC) messaging in the example of a commercial aircraft based application, are also generally unable to be accessed by potential users of the data.

Accordingly, it would be desirable to provide a system and method for collecting and analyzing automatic dependent surveillance data and other types of data generated by the mobile platforms, from the mobile platforms, in which the system is responsive to analyze, display, and distribute the collected data for use by a wide range of users.

SUMMARY

A system and method for collecting and analyzing data generated by at least one mobile platform. The system includes a source of at least one user input, and a data interface control module that collects at least one type of data from the mobile platform, based on the user input, with the data related to the operation of the mobile platform. The system also comprises an analysis control module that analyzes the data collected by the data interface control module and generates analysis data based on the user input.

In one embodiment, the present disclosure further provides a system for collecting and analyzing data generated by at least one mobile platform. The system includes a source of at least one user input, and a data interface control module that collects at least one type of data from the mobile platform, based on the user input, with the data related to the operation of the mobile platform during a pre-defined interval. The system also comprises an analysis control module that analyzes the data collected by the data interface control module and generates analysis data based on the user input, and an interface manager control module that receives the user input and the analysis data from the analysis control module, and displays the analysis data on an interface.

In another implementation, the present disclosure further provides a method of collecting and analyzing data generated by a mobile platform. The method includes generating at least one request for data related to the operation of a selected mobile platform, and querying the mobile platform for the data indicating the occurrence of the event. The method also includes outputting the data received from the mobile platform to at least one interface to enable the manipulation of the data.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The present disclosure will become more fully understood from the detailed description and the accompanying drawings, wherein:

FIG. 8 illustrates an exemplary index of raw data available for export;

FIG. 9 illustrates an exemplary estimated time of arrival versus actual arrival data screen;

FIG. 14 illustrates a second exemplary wind data analysis screen;

FIG. 21 illustrates a second exemplary import screen;

DETAILED DESCRIPTION

The following description is merely exemplary in nature and is not intended to limit the present disclosure, application, or uses. Although the following description is related generally to automatic dependent surveillance data collection and analysis for a mobile platform, such as a commercial aircraft, it will be understood that the collection architecture as described and claimed herein is applicable to any type of mobile platform (such as an aircraft, ship, spacecraft, train or land-based motor vehicle) to which it is desired to collect data therefrom. Further, the collection architecture described herein can be applicable to various other applications besides surveillance data collection. Therefore, it will be understood that the following discussion is not intended to limit the scope of the appended claims to only commercial aircraft or surveillance data collection applications.

Figure 1:
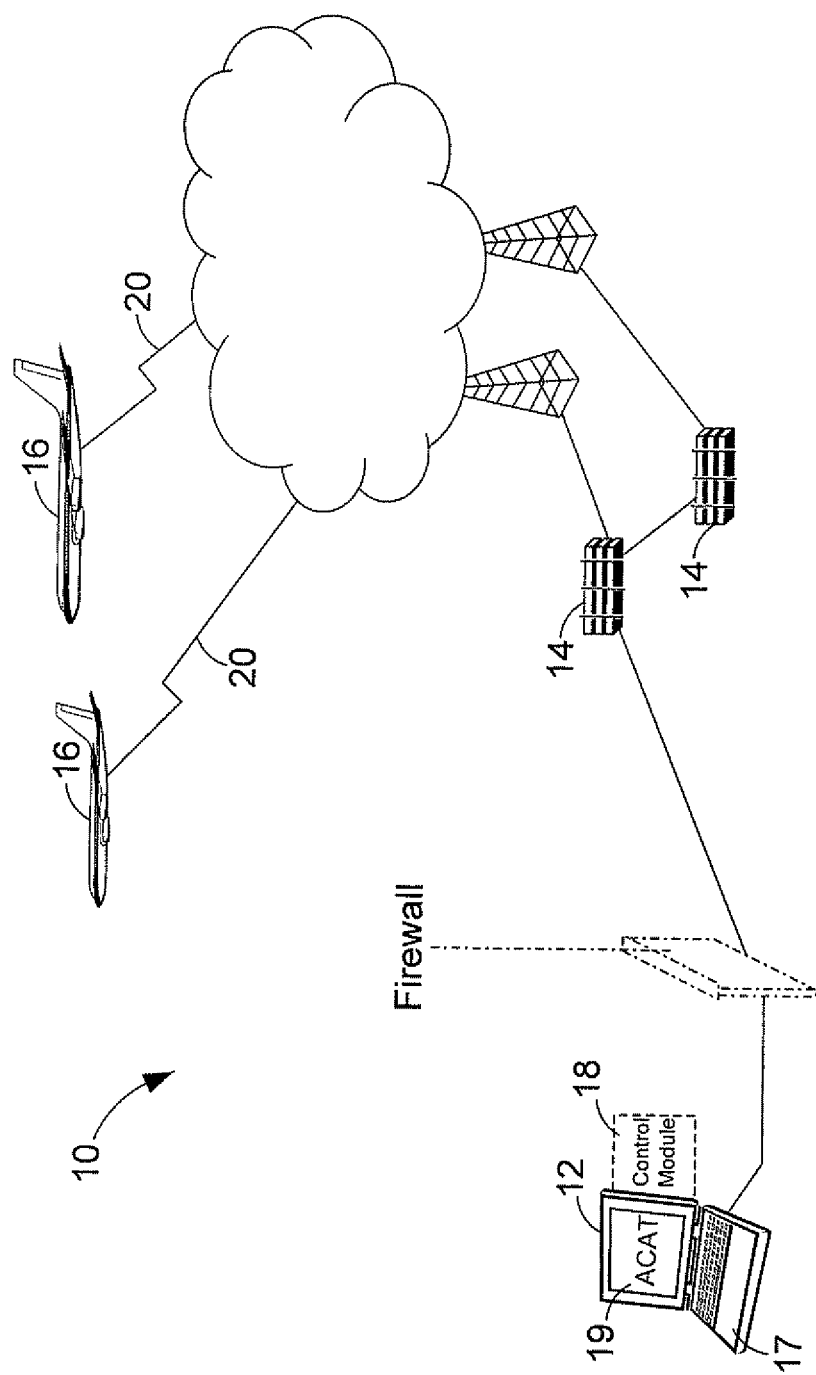
FIG. 1 is a schematic view of a data collection system for automatic dependent surveillance collection and analysis according to the principles of the present disclosure.

With reference to FIG. 1, an environmental view illustrates an exemplary data collection system 10. The data collection system 10 includes a workstation or computer 12, one or more mobile platform or aircraft communication servers 14 and one or more mobile platforms, or aircrafts 16. The computer 12 includes a user input device 17 and a data collection control module 18 that executes at least one or a series of user interfaces that collectively form software 19. The user input device 17 enables the user to interface with the user interfaces and to provide user input to the control module 18, such as the type of data to collect, and at what interval, as will be discussed. The control module 18 initiates the collection of data from the aircraft 16, based on the user input, via a request or contract transmitted to the aircraft communication servers 14, as will also be discussed herein.

The aircraft communication servers 14 receive the data requests or contracts from the control module 18 and transmit these data requests or contracts over one or more data links 20 to the aircrafts 16. The data links 20 comprise any suitable data link technology compatible with the particular aircraft 16, such as a satellite, High Frequency (HF) or Very High Frequency (VHF) data link. In addition, over the data links 20, the aircraft communication servers 14 receive the data requested by the control module 18 and transmit this data to the data collection control module 18. The aircraft communication servers 14 can comprise a local service provider, such as SITA of Geneva, Switzerland or ARINC of Annapolis, Md. In addition, the aircraft communication servers 14 can communicate between each other to facilitate the collection of data from the aircrafts 16, or the control module 18 can communicate between the aircraft communication servers 14 if desired.

Figure 2:
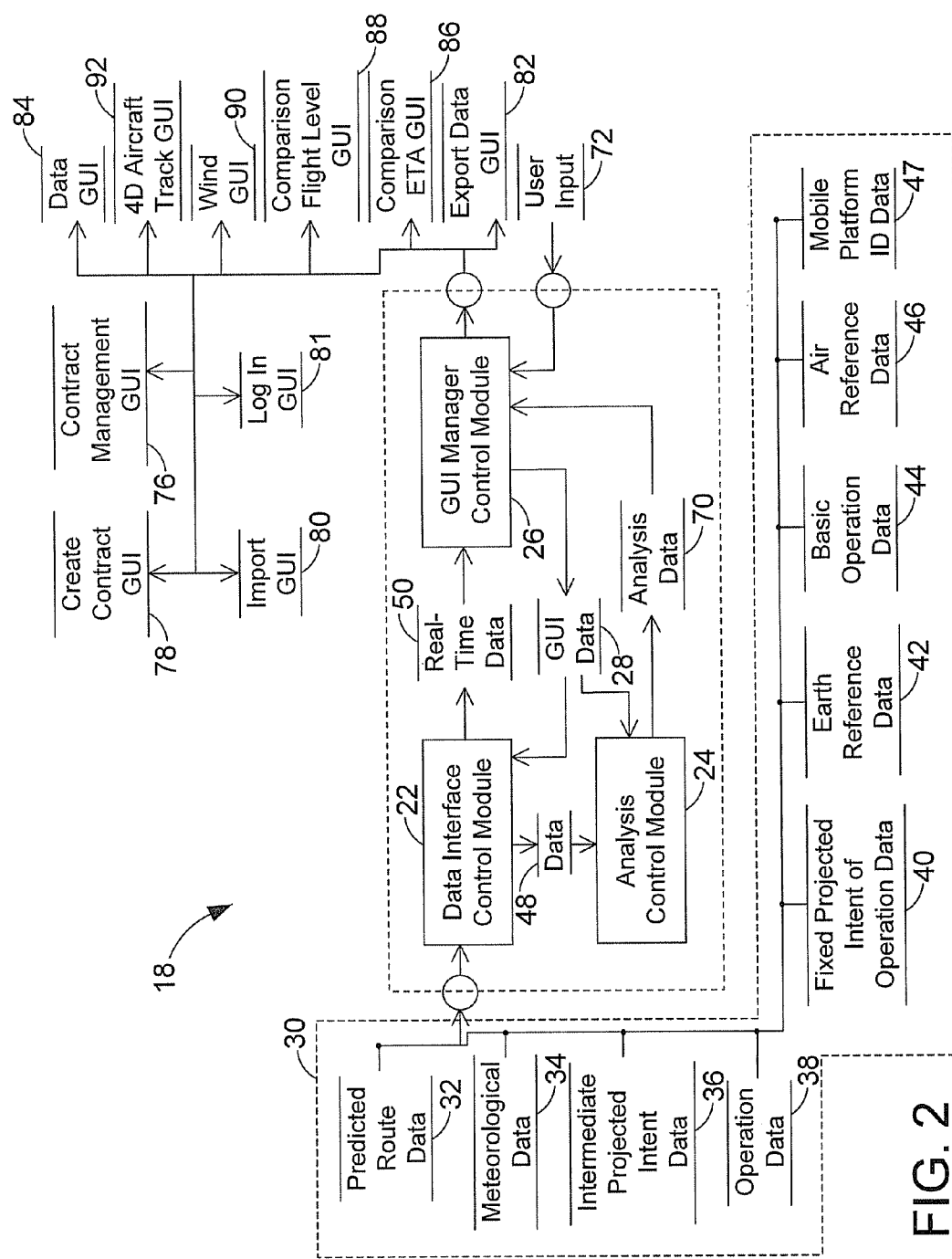
FIG. 2 is a dataflow diagram illustrating an exemplary collection control system of the present disclosure.

With reference now to FIG. 2, the control module 18 is illustrated in greater detail. In FIG. 2, a dataflow diagram illustrates various components of a collection control system that can be embedded within the control module 18. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality. Various embodiments of the data collection system according to the present disclosure may include any number of sub-modules embedded within the control module 18. The sub-modules shown may be combined and/or further partitioned to similarly collect data associated with respective aircraft(s). Inputs to the system may be received from other control modules (not shown) within the aircraft 16, and/or determined by other sub-modules (not shown) within the data collection system 10 (not shown). In the exemplary embodiment, the control module 18 is implemented according to an object-oriented approach using pre-defined class definitions that define data objects and corresponding operations. As may be appreciated, the control module 18 may similarly be implemented according to other software programming methods. In various embodiments, the control module 18 of FIG. 2 includes a data interface control module 22, an analysis control module 24 and a graphical user interface (GUI) manager module 26.

The data interface control module 22 receives as input GUI data 28 and various forms of data 30. The GUI data 28 comprises a request to collect the data 30. The data 30 is collected from a variety of sources on the aircraft 16, and includes predicted route data 32, meteorological data 34, intermediate projected intent data 36, operation identification data 38, fixed projected intent of operation data 40, earth reference data 42, basic operation data 44, air reference data 46 and mobile platform identification data 47. The types of data 30 gathered from the aircraft 16 may generally be that defined in RTCA Document DO-258A. For instance, the predicted route data 32 may include a first next predicted altitude, a first next estimated time of arrival, a first next latitude and longitude associated with the location of the aircraft 16, a second next predicted altitude and a second next latitude and longitude associated with the location of the aircraft 16. The meteorological data 34 may include the temperature, wind direction and the wind speed. The intermediate projected intent data 36 may include up to 10 sets of future aircraft position data comprising an altitude, a distance, a projected time and a true track of the aircraft 16.

The operation identification data 38 may include the flight identification associated with the aircraft 16. The fixed projected intent of operation data 40 may include the altitude, the latitude and longitude associated with the location of the aircraft 16, and a projected time, at a point in time requested by the ground The earth reference data 42 may include the groundspeed, the true track of the aircraft 16 and a vertical rate of climb or descent associated with the aircraft 16. The basic operation data 44 may include the altitude, a figure of merit associated with the aircraft 16, the latitude and longitude associated with the location of the aircraft 16, a timestamp and if an emergency exists on the aircraft 16. The air reference data 46 may include the mach speed, the true heading of the aircraft 16 and the vertical rate of climb or descent of the aircraft 16. The mobile platform identification data 47 may comprise a 24-bit address of the aircraft 16.

It should be noted that this data 30 could be just a few of the data 30 provided to the data interface control module 22, and further, particular operators of the control module 18 may desire additional or alternative types of data 30. For example, the data 30 collected could be that defined in RTCA Document DO-702A, AEEC Specification ARINC 718 and RTCA Document DO-181, RTCA Document DO-280B and ICAO Document 9705, ICAO Document 9694, RTCA Document DO-260A. Based on the GUI data 28, data interface control module 22 determines which data 30 to collect from the aircraft 16. The data interface control module 22 sets the data collected as data 48 for the analysis control module 24. The data interface control module 22 also sets real-time data 50 for the GUI manager module 26.

Figure 3:
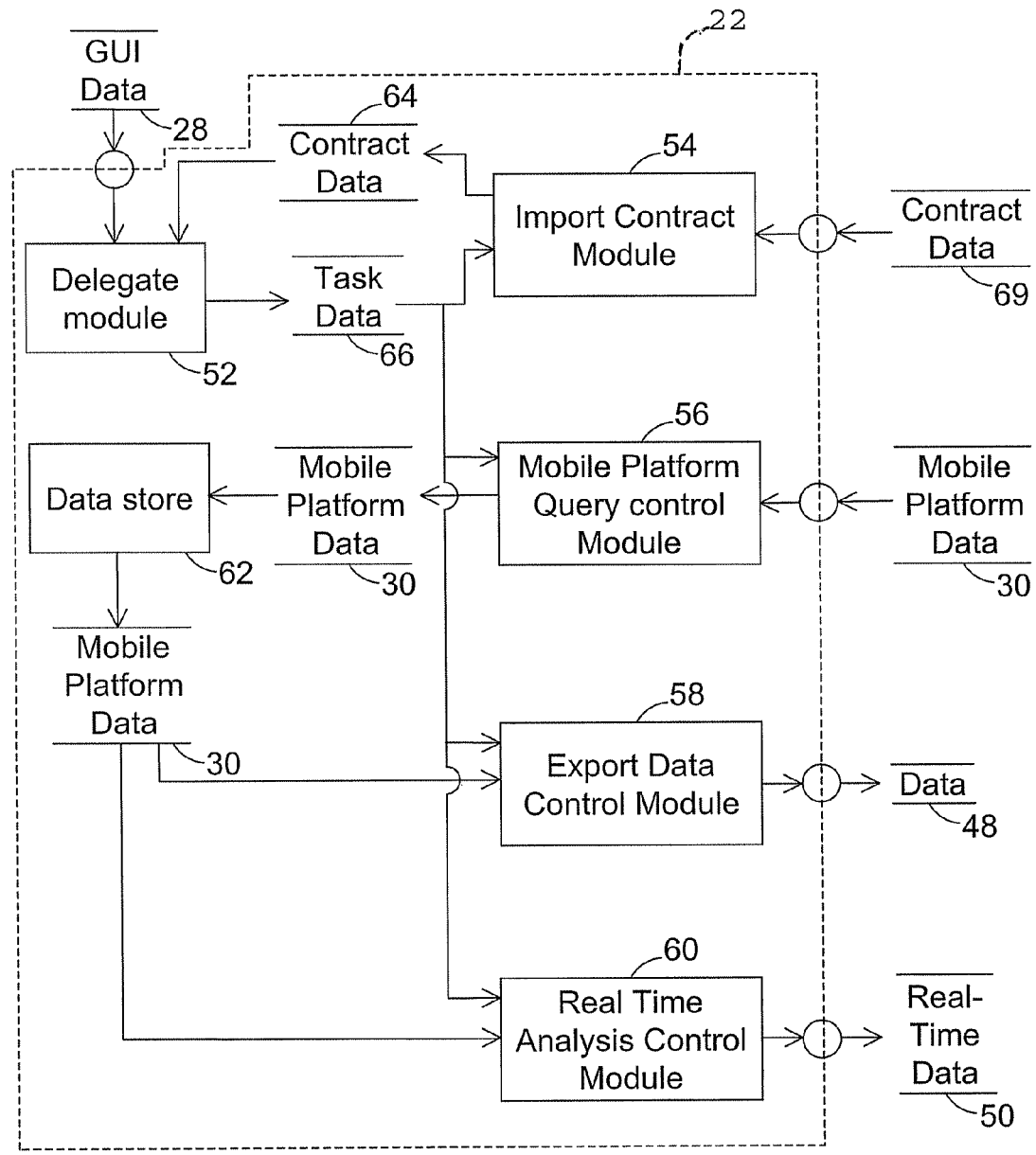
FIG. 3 is a dataflow diagram illustrating a data interface system for collecting the data for the system of FIG. 2.

With reference now to FIG. 3, a dataflow diagram illustrates one exemplary embodiment of a data interface system that can be embedded within the data interface control module 22. In this embodiment, the data interface control module 22 includes a delegate module 52, an import contract module 54, a mobile platform query control module 56, an export data control module 58, a real-time analysis control module 60 and a data store 62.

The delegate module 52 receives as input GUI data 28 and contract data 64. The contract data 64 may comprise a contract imported into the control module 18 by the import contract module 54, as will be discussed herein. Based on the GUI data 28, the delegate module 52 can set task data 66 for the import contract module 54, the mobile platform query control module 56, the export data control module 58, and the real-time analysis control module 60. The task data 66 comprises, for example, a request to import a contract for the import contract module 54, a request to query the aircraft 16 for data 30 for the mobile platform query control module 56, a request to export data for the export data control module 58, or a request for real-time analysis for the real-time analysis control module 60.

The import contract module 54 receives as input the task data 66 and contract data 69. The contract data 69 may comprise a contract that is provided from an external source such as a USB memory device or imported into the control Module 18 from a program such as a spreadsheet program. Once the import contract module 54 receives the contract data 69, the import contract module 54 may set the contract data 64 for the delegate module 52. The mobile platform query control module 56 receives as input the task data 66 and the mobile platform data 30. The mobile platform query control module 56, based on the task data 66, queries the aircraft .16 to obtain the mobile platform data 30. Once the mobile platform query control module 56 obtains the mobile platform data 30, the mobile platform query control module 56 sets the mobile platform data 30 to the data store 62. The export data control module 58 receives as input the task data 66 and the mobile platform data 30 from the data store 62. Based on the task data 66 that comprises, for example, a request to export data, the export data control module 58 outputs data 48 for use by the analysis control module 24 as shown in FIG. 2.

The data store 62 receives as input the mobile platform data 30. The data store 62 comprises one or more data storage devices and may be at least one of Random Access Memory (RAM), Read Only Memory (ROM), a cache, a stack, or the like which may temporarily or permanently store electronic data associated with the data interface control module 22, such as the mobile platform data 30.

With reference back to FIG. 2, the analysis control module 24 receives as input the data 48 from the data interface control module 22 and GUI data 28 from the GUI manager module 26. The analysis control module 24 is operable to perform an analysis on the data 48, based on the parameters defined in the GUI data 28, as will be discussed with reference to the GUI manager module 26. The analysis control module 24 sets analysis data 70 for the GUI manager module 26.

The GUI manager module 26 receives as input the real-time data 50, the analysis data 70 and user input 72. The user input 72 comprises data entered via the user input device 17 to the computer 12. Various types of user input 72 may be received by the GUI manager module 26, such as a request for data collection from one or more aircraft 16 or a request for analysis data 70, as will be discussed herein. Based on the user input 72, the GUI manager module 26 outputs at least a contract management GUI 76, a create contract GUI 78, an import GUI 80, a log-in GUI 81, an export data GUI 82, a data GUI 84, a comparison ETA GUI 86, a comparison flight level GUI 88, a wind GUI 90 and a 4D aircraft track GUI 92.

Figure 4:
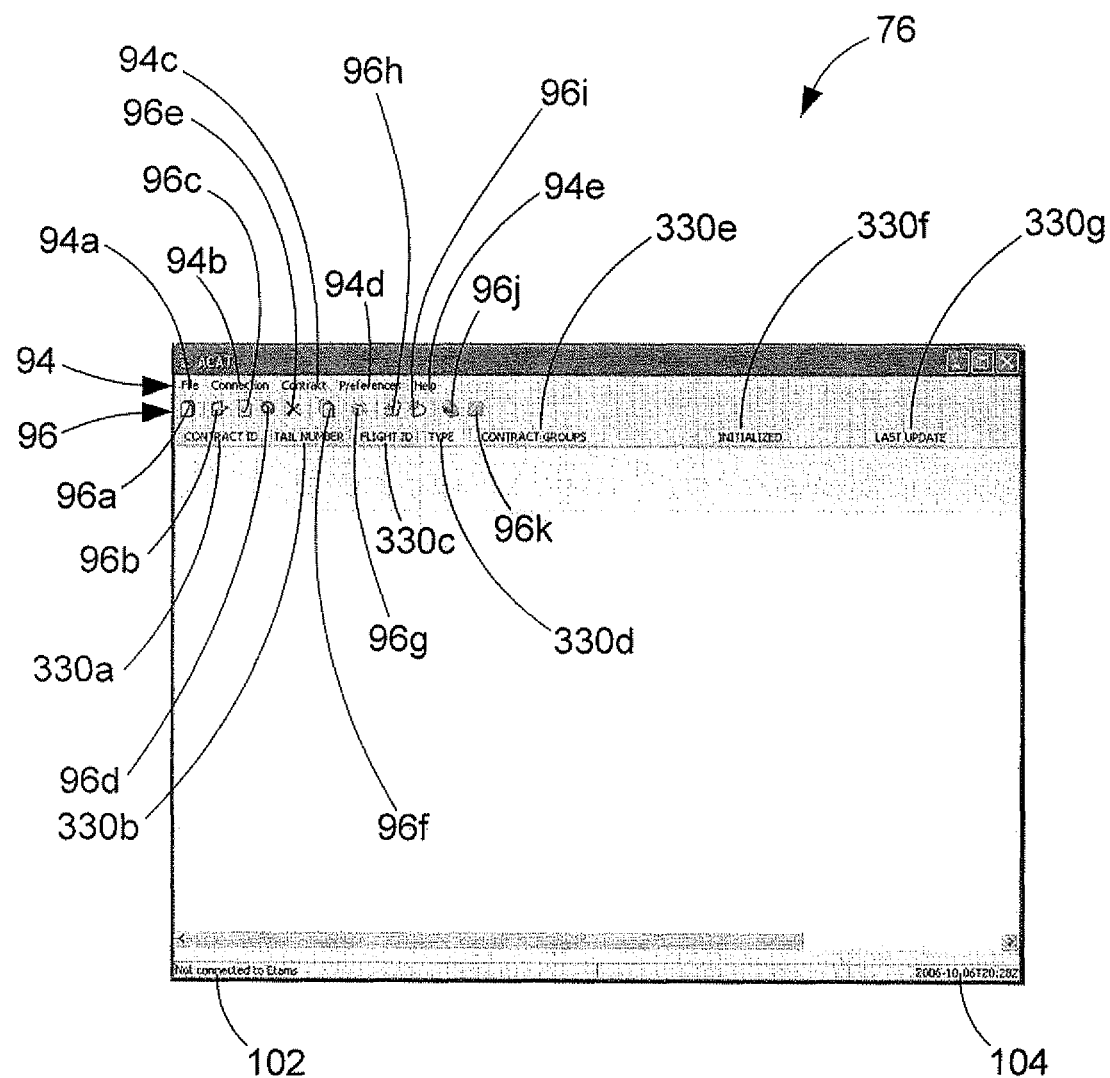
FIG. 4 illustrates an exemplary contract management screen for the system of FIG. 2.
Figure 5:
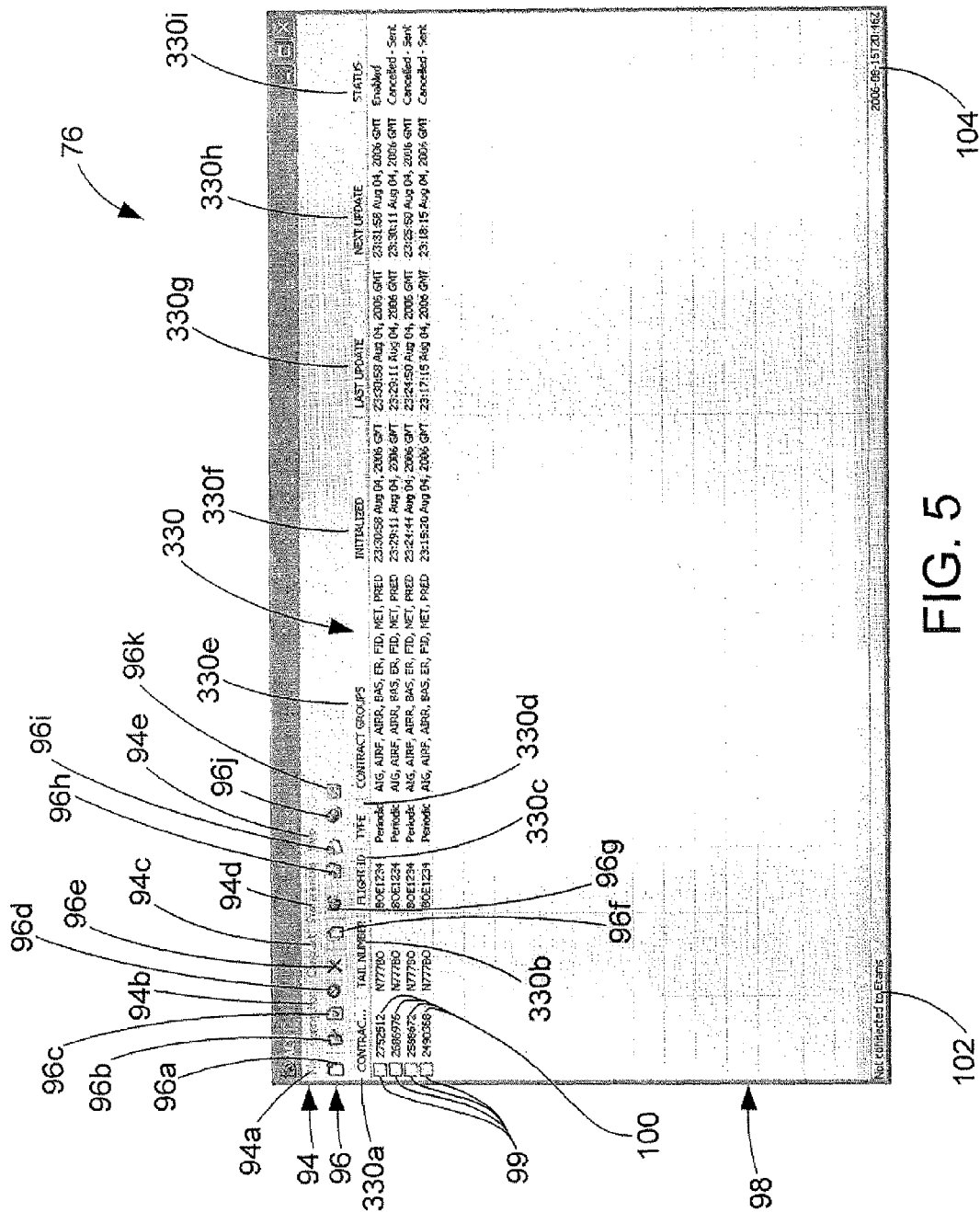
FIG. 5 illustrates an exemplary contract management screen populated with contracts.

With reference now to FIGS. 4 and 5, the contract management GUI 76 is illustrated. The contract management GUI 76 includes drop-down menus 94, selector icons 96, tabular data identifiers 98 and tabular data or contracts 100, if they exist. The contract management GUI 76 also includes a connection indicator 102 and a time, date or time-date stamp 104.

The drop-down menus 94 may include a "File" menu 94*a*, a "Connection" menu 94*b*, a "Contract" menu 94*c*, a "Preferences" menu 94*d* and a "Help" menu 94*e*. As the drop-down menus 94 contain similar functionality as the selector icons 96, the drop-down menus 94 will not be discussed in great detail herein. Briefly, however, the "File" menu 94*a* may include "Export" and "Exit" selections (not shown). The selection of "Export" invokes the export data GUI 82, while the selection of "Exit" closes all server connections, and closes the system 10, as will be discussed in greater detail herein. The "Connection" menu 94*b* includes "Log-on" and "Log-off." The selection of "Log-on" authenticates the user to the aircraft communication server 14. A successful authentication of the user results in an attempt to connect to the aircraft communication server 14. The connection indicator 102 updates accordingly. The selection of "Logoff" sets an internal token to 'not authenticated' such that no connectivity with the aircraft communication server 14 occurs. The connection indicator 102 updates accordingly.

The "Contract" menu 94*c* may include "Create," "Copy," "Edit," "Enable," "Cancel," "Delete" and "Import" selections (not shown). The selection of "Create" displays the create contract GUI 78. The selection of "Copy" when a contract 100 is selected via a selector 99 copies the contract 100 and populates the create contract GUI 78 with the data associated with the selected contract 100 for display. The selection of "Edit" with a contract 100 copies the contract 100 and populates the create contract GUI 78 with the data associated with that contract 100 for display. The selection of "Enable" with a contract 100 activates the contract 100 for the collection of data and notifies the uplink server that the contract 100 is ready for execution. The selection of "Cancel" with a contract 100 will cancel the contract 100, and the selection of "Delete" with a contract 100 will delete the contract 100. The selection of "Import" with a contract 100 displays the import GUI 80.

The "Preferences" menu 94d may include "Manage Preferences" and "View Console" selections (not shown). The selection of the "Manage Preferences" displays a GUI (not shown) to enable the management of specific preferences for the software 19. The selection of "View Console" toggles the view to a sash containing a stream of the logs/acat.log file (not shown). The "Help" menu 94e includes an "About" selection (not shown). The "About" selection describes the software 19 and the build number.

Figure 6:
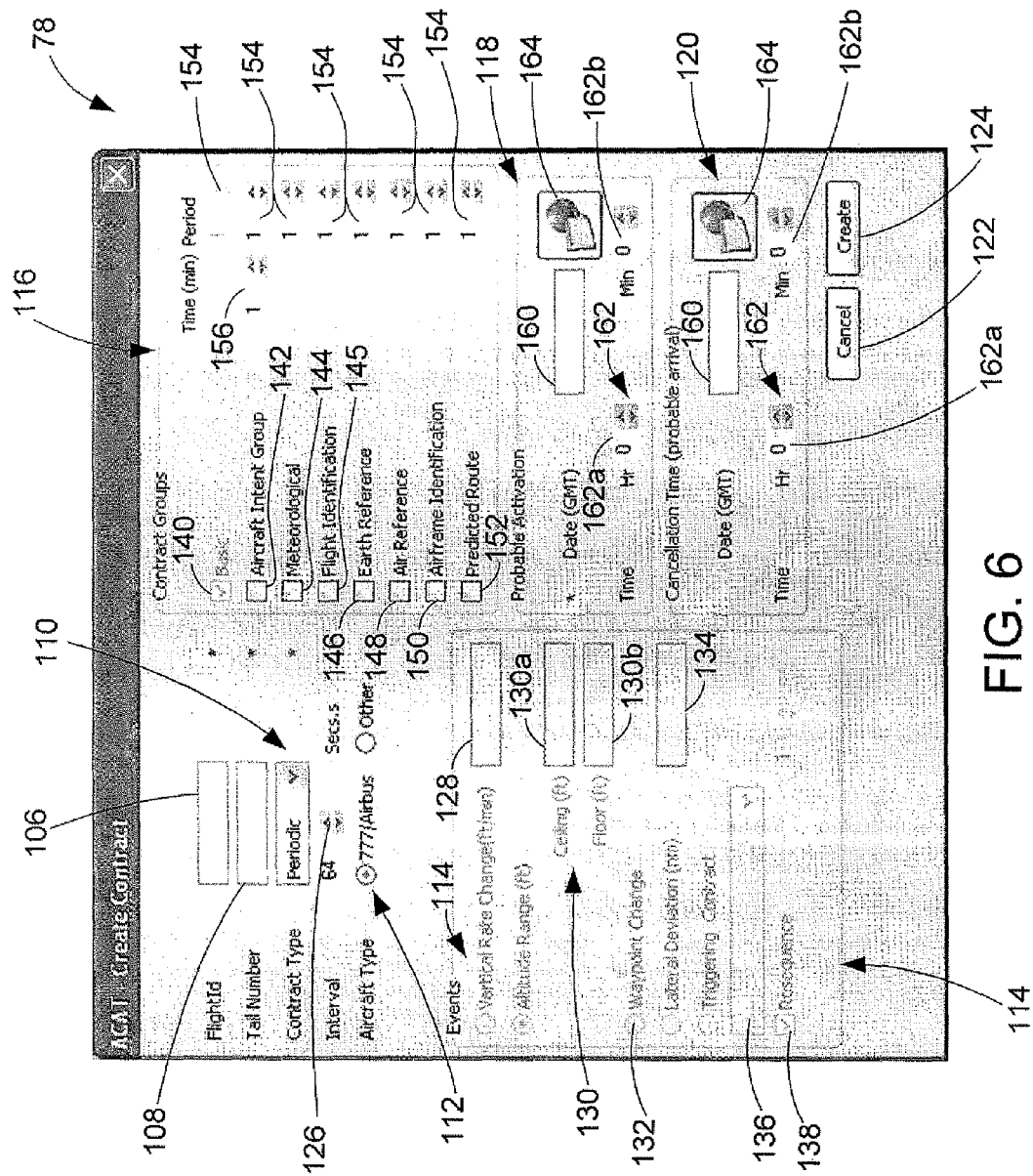
FIG. 6 illustrates an exemplary "Create Contract" screen.

The selector icons 96 may include a contract selector icon 96a, an edit selector 96b, an enable contract selector 96c, a cancel contract selector 96d, a delete contract selector 96e, a copy contract selector 96f, a real-time analysis selector 96g, an export data selector 96h, an import contracts selector icon 96i, a connect selector icon 96j and a log-off selector icon 96k. The contract selector icon 96a, when selected, prompts the GUI manager module 26 to output the create contract GUI 78, as shown in FIG. 6. The create contract GUI 78 includes a flight identification text box 106, a mobile platform identifier or tail number text box 108, an interval or type of contract drop-down menu 110, a type of mobile platform or aircraft type selector 112, an events sub-menu 114, a contract sub-menu 116, a probable activation selector 118 and a probable deactivation or cancellation time selector 120. The create contract GUI 78 also includes a cancel selector 122 and a create selector 124.

The flight identification text box 106 enables the identification of a particular flight from which to collect the data 30, and the tail number text box 108 enables the identification of the particular aircraft 16, traveling on that flight plan from which the data 30 is desired. The type of contract drop-down menu 110, when selected, enables the selection of an interval associated with the execution of the contract or request for data 30. The interval, for example, may include "Periodic," "Event" or "Demand" (each not specifically shown). If "Periodic" is selected, then an interval selector 126 is displayed to enable the selection of a period, in seconds, to repeat the data collection. If "Event" is selected, then the interval selector will be default to zero and will be uneditable, and the events sub-menu 114 is activated, as will be discussed. If "Demand" is selected, then the interval selector 126 will default to zero, and will be uneditable. The aircraft type selector 112 may comprise a radio button, for example, that enables the selection of the particular model of aircraft 16 associated with the tail number and particular flight, such as "Boeing" or "Airbus." This allows selection of aircraft-specific data extraction features.

The events sub-menu 114 is activated when "Event" is selected from the type of contract drop-down menu 110. The events sub-menu 114 enables the user to specify the contract to gather data related to the occurrence of a particular event during the operation of the aircraft 16. The events sub-menu 114 may include a vertical rate change text box 128, an altitude range selector 130, a waypoint change 132 selector, a lateral deviation text box 134, a triggering contract drop-down menu 136 and a resequence selector 138.

The vertical rate change text box 128, when selected, enables the contract to be executed to collect data 30 when a specific vertical rate of change in feet per minute occurs during the flight of the aircraft 16. The altitude range selector 130, when selected, enables the contract to be executed to collect data 30 when the aircraft 16 leaves a particular altitude range that is specified in feet in a ceiling text box 130a and a floor text box 130b. The waypoint change 132 selector, when selected, enables the contract to be executed to collect data 30 when a waypoint in the aircraft's active flight plan is passed, or a waypoint change occurs in the aircraft's active flight plan. The lateral deviation text box 134, when enabled collects data 30 when a specific lateral deviation in nautical miles (nm) occurs during the flight of the aircraft 16.

The triggering contract drop-down menu 136, when selected, enables the current contract to be executed to collect data 30 after another contract has been executed. The triggered contract is selected from the contract drop-down menu 136, which provides a list of all pending contracts. The receipt of the report from the triggering contract will then trigger the activation of the selected contract. The re-sequence selector 138 may be selected with an event contract. The re-sequence selector 138, when selected, will re-enable the current contract for the specified number of times; each time the event contract triggers and therefore expires, a new event contract of that type will be enabled for the number of times set in the re-sequence selector 138. Thus, if the resequence selector 138 is set to two, the current contract will be re-enabled twice—once after the initial event contract reports (and expires), and again after the newly enabled event contract reports (and expires).

The create contract GUI 78 also includes the contract sub-menu 116. The contract sub-menu 116 enables the selection of the type of data 30 to be collected by the contract 100. The contract sub-menu 116 may include a basic selector 140, an aircraft intent group selector 142, a meteorological selector 144, a flight identification selector 145, an earth reference selector 146, an air reference selector 148, an airframe identification selector 150 and a predicted route selector 152. One or more of the basic selector 140, aircraft intent group selector 142, meteorological selector 144, flight identification selector 145, earth reference selector 146, air reference selector 148, airframe identification selector 150 and predicted route selector 152 may be selected to instruct the contract 100 to gather and return in a report the data 30 associated with that specific selector at a specified interval 154.

The basic selector 140, when selected, instructs the contract 100 to gather the basic operation data 44 at the specified interval 154, if the contract 100 is a periodic contract. If the specified interval 154 is selected as "1," then the basic operation data 44 will be included in every report generated by the contract 100 for the period of the contract 100. If the specified interval 154 is "2," for example, then the basic operation data 44 will be included in every other report generated by the contract 100 during the period of the contract (not shown). The aircraft intent group selector 142, when selected, instructs the contract 100 to gather the intermediate projected intent data 36 and the fixed projected intent of operation data 40 at a specified time 156 between about 1 and about 255 minutes for the specified interval 154. The specified time 156 of between about 1 and about 255 minutes identifies the amount of time into the future the aircraft 16 should report its projected intent (e.g. report your intent for the next 1 minute, the next 100 minutes, etc.).

The meteorological selector 144, when selected, instructs the contract 100 to gather the meteorological data 34 at the specified interval 154. The flight identification selector 145, when selected, instructs the contract 100 to gather the operation identification data 38 at the specified interval 154. The earth reference selector 146, when selected, instructs the contract 100 to gather the earth reference data 42 at the specified interval 154. If the air reference selector 148 is selected, the contract is instructed to gather the air reference data 46 at the specified interval 154. The airframe identification selector 150, if selected, instructs the contract 100 to gather and report the mobile platform identification data 47 at the specified interval 154, and the predicted route selector 152, if selected, instructs the contract to gather and report the predicted route data 32 at the specified interval 154.

The create contract GUI 78 also includes the probable activation selector 118 and the probable deactivation or cancellation time selector 120. The probable activation selector 118 enables the user to specify when to activate the contract 100. This enables the user to create contracts 100 well in advance of the particular flight of the selected aircraft 16. Thus, the desired data 30 may be gathered without requiring the user to gather the data 30 in real-time. The cancellation time selector 120 enables the user to specify when to deactivate the contract. Thus, when combined, the probable activation selector 118 and the cancellation time selector 120 enable the user to define a specified time period or interval for the automatic running of the contract 100, and thus, the user does not need to manually initiate the contract 100 to gather and report selected data 30 during the desired time period.

Each of the probable activation selector 118 and the cancellation time selector 120 may include a date text box 160, time selectors 162 and a calendar icon 164. The date text box 160 enables the entry of a date for the activation or deactivation of the contract, and the time selectors 162 enable the selection of an hour 162a and minutes 162b in which to activate and deactivate the contract. The calendar icon 164, when selected, displays a calendar to enable the user to locate the date desired for the execution of the contract (not shown). The date text box 160 may be populated by the user highlighting a day on the calendar (not shown).

The create contract GUI 78 includes the cancel selector 122 and the create selector 124. The cancel selector 122, when selected, closes the create contract GUI 78 without saving any of the information entered or selected on the create contract GUI 78. The create selector 124, when selected, verifies that the user entered all the required data and creates the contract 100. Entries must be made in the flight identification text box 106, the tail number text box 108, the type of contract drop-down menu 110, the aircraft type selector 112, the probable activation selector 118 and the cancellation time selector 120 to create a contract. In addition, if the aircraft intent group selector 142 is selected, then the time 156 is required to create the contract. Further, if a triggering contract is selected, then the triggering contract is required to be specified in the triggering contract drop-down menu 136. After the contract 100 is created, the contract management GUI 76 is displayed, with the contract 100 listed, as shown in FIG. 5.

With continuing reference to FIG. 5, the edit selector 96b, when selected, enables the user to edit an existing contract 100. In order to select the edit selector 96b, a contract 100 must be selected via the selector 99. In addition, the user may double select a contract 100, such as double-clicking on the contract 100 using a user input device 17, such as a mouse, to edit the contract 100. When the edit selector 96b is selected along with a contract 100, or if the contract 100 is double selected, then the create contract GUI 78 will be displayed by the GUI manager module 26 and populated with the data and/or selections previously associated with that contract 100.

The enable contract selector 96c, when selected with a contract 100, will enable or activate the contract 100. In order to enable the contract, the contract 100 may be selected by the selector 99 and then the enable contract selector 96c may be selected. In addition, the GUI manager module 26 may display a confirmation screen prior to enabling the contract 100 (not shown). The cancel contract selector 96d, when selected with one or more contracts 100, will disable the selected contracts 100. The delete contract selector 96e, when selected with one or more contracts 100, will delete the selected contracts. The GUI manager module 26 may display a confirmation GUI to verify that the user wants to delete the selected contracts 100 (not shown).

The copy contract selector 96f enables the user to copy the selected contract 100 as a basis for a new contract 100. Thus, when the copy contract selector 96f is selected with a contract 100, the create contract GUI 78 is displayed by the GUI manager module 26 and populated with the data and/or selections associated with the copied contract 100. The view real-time analysis selector 96g enables the user to view an analysis of the data 30 collected by the contract in real-time (not shown). The real-time views allow the user to follow an aircraft's flight as it progresses, in both the lateral and vertical planes. The user can also view weather outputs as they are reported, and the projected path of the aircraft through the reported intent data.

Figure 7:
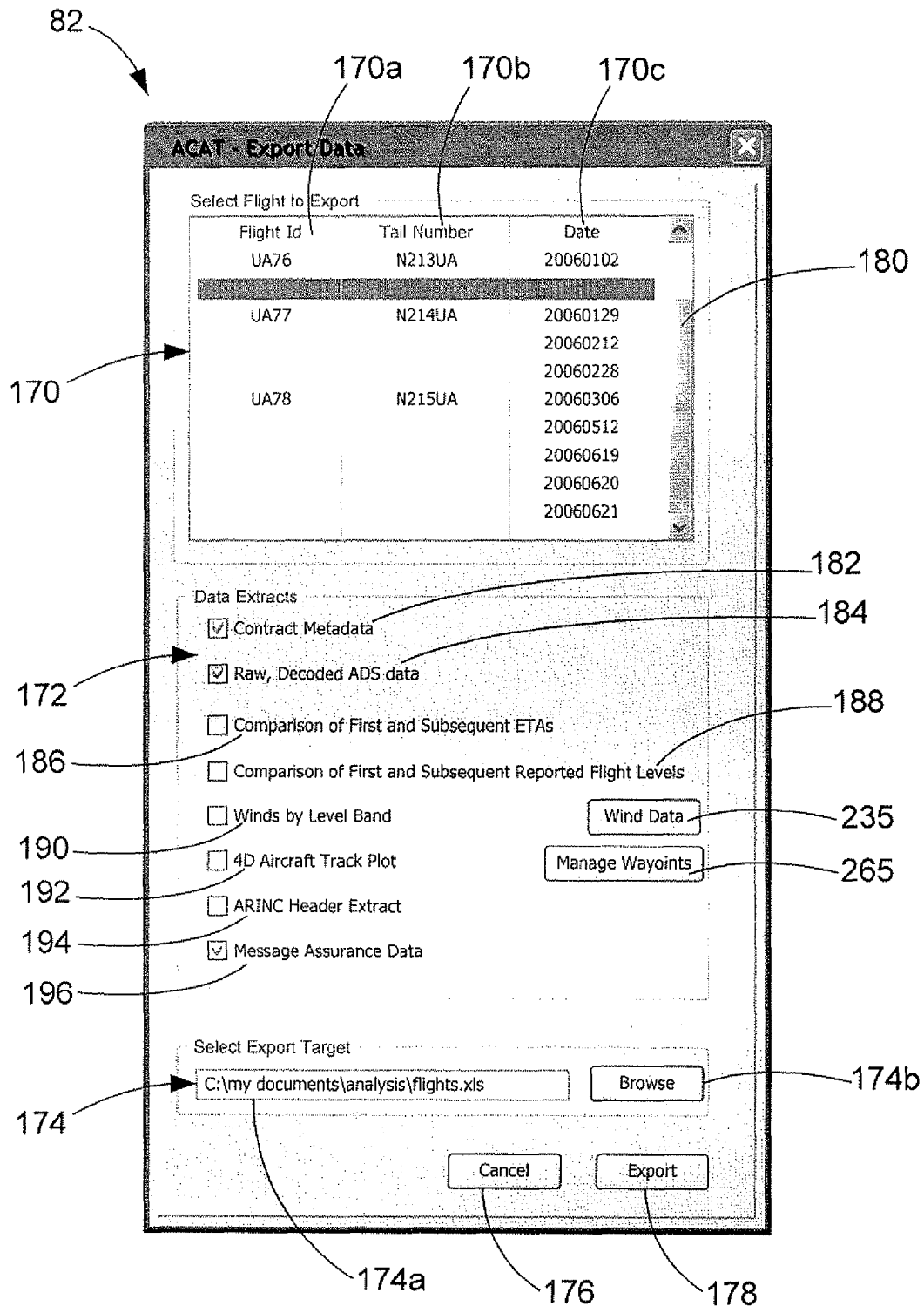
FIG. 7 illustrates an exemplary "Export Data" screen.

The export data selector 96h, when selected, prompts the GUI manager module 26 to display the export data GUI 82, as shown in FIG. 7. The export data GUI 82 enables the user to select the type of analysis to be performed on the data 30 collected by the contract 100, or if the user wants just the raw data 30 outputted. When the export data selector 96h is selected, the export data control module 58 is initiated to output the data 48 to the analysis module 24, and based on the GUI data 28 provided from the selection entered on the export data GUI 82, the analysis module 24 sets analysis data 70 that includes the data 48 formatted and/or analyzed as desired by the user on the export data GUI 82. Thus, the export data GUI 82 may include a data selector 170, a data extract sub-menu 172 and an export target selector 174 to enable the user to specify the data 30 to export along with the format in which to present the exported data 30, and a location to export the data 30 to. The export data GUI 82 also includes a cancel selector 176 and an export selector 178.

The data selector 170 presents the user with a list of contracts 100 containing data reports that are available for export. For example, the data selector 170 may list the available contracts based on the flight identification 170a, and may further sort the contracts by the tail number 170b or the date 170c. A scroll bar 180 may be employed to scroll amongst the available contracts 100. In addition, the user may highlight the contract 100 in the data selector 170 in order to select it for export.

The data extract sub-menu 172 enables the user to select the format for the data 30 to be exported. The user may select to have the data 30 in the contract 100 to be analyzed and/or for the raw data 30 to be displayed by the GUI manager module 26. The data extract sub-menu 172 may include a contract metadata selector 182, a raw data selector 184, a comparison of estimated arrival times (ETAs) selector 186, a comparison of reported flight levels selector 188, a winds selector 190, a 4D aircraft track plot selector 192, an ARINC header extract selector 194 and a message assurance data selector 196. Each selection will populate an individual GUI for displaying the analysis data 70. All estimates in the above list can also be displayed against the associated actual values, so that the user can compare the accuracy of predictions reported during the flight operation against the actual performance of the flight operation.

The contract metadata selector 182, when selected, will populate a GUI with a tabular format, with the following fields populated from the analysis data 70: flight identification, tail number, date, contract identification, type of contract, interval, aircraft type, initialization time and date, cancellation time and date, IATA address used in signature line indicating which ground system 14 has been used to access the aircraft 16, contract groups requested in the contract submenu 116 and the message to the aircraft 16 generated by the aircraft communication server 14 (not shown).

The raw data selector 184, when selected, will populate the data GUI 84, based on the data index shown in FIG. 8. The data GUI 84 (not shown) may display the raw data selected by the user in the data index of FIG. 8. The data GUI 84 may include all of the messages sent by the aircraft 16 to the aircraft communications servers 14 for the flight associated with the contract 100, and may populate the following grouped fields based on the data 48 received by the analysis module 24: message information 190, basic group 192 (comprising basic operation data 44), predicted route group 194 (comprising predicted route data 32), fixed projected intent group 196 (comprising fixed projected intent of operation data 40), air reference group 198 (comprising air reference data 46), meteorological group 200 (comprising meteorological data 34), intermediate projected intent group 202 (comprising intermediate projected intent data 36) and flight identification group 204 (comprising operation identification data 38). Generally, the fields populated in the data GUI 84 comprise the fields that are defined within the DO258A standard for the exemplary instantiation described here. Other exemplary instantiations would utilize fields from the other standards referenced in this disclosure.

Figure 10:
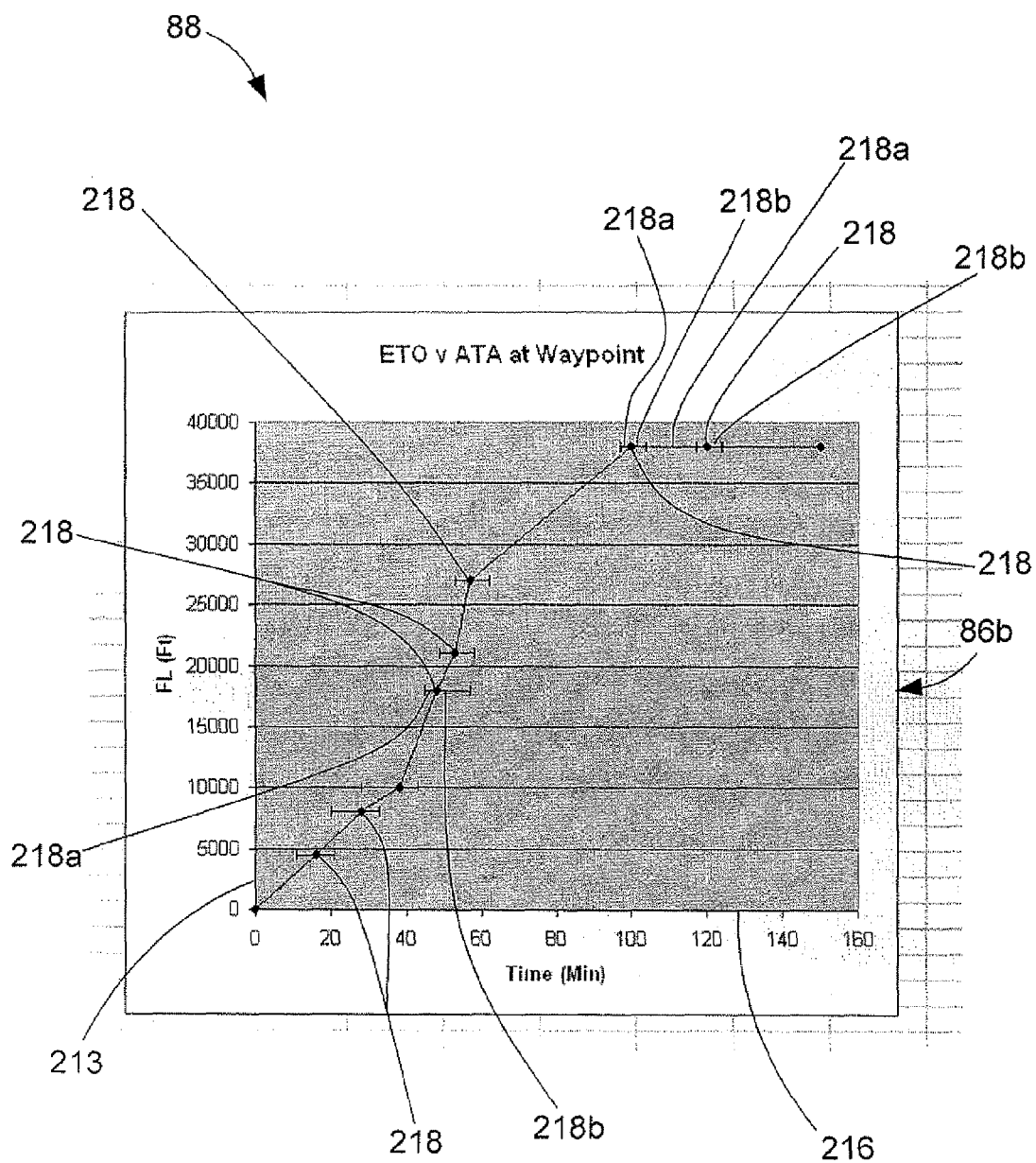
FIG. 10 illustrates an exemplary "ETO v. ATA at Waypoint" screen.

With reference back to FIG. 7, the comparison of estimated arrival times (ETAs) selector 186, when selected, will populate the comparison ETA GUI 86, as shown in FIGS. 9 and 10. The comparison ETA GUI 86 may comprise a first GUI 86*a* (FIG. 9) that includes, in a tabular format, accuracy statistics, and a second GUI 86*b* (FIG. 10) that includes, in a graphical format, a comparison of the ETAs from the predicted route data 32 and the actual time of arrival (ATA) from the basic operation data 44 or another source of data such as radar positions. The first GUI 86*a* and second GUI 88*b* could be a single comparison ETA GUI 86, or the second GUI 86*b* could be located within the first GUI 88*a*. As shown in FIG. 9, the first GUI 86*a* may have the following fields: waypoint 206, ATA 208, flight level (FL) 210, minimum ETA difference 212 and maximum ETA difference 214. The fields may be populated by the analysis data 70, which includes the predicted route data 32 and the basic operation data 44.

With reference to FIG. 10, the second GUI 86*b* may graphically illustrate the ETA versus the ATA at the particular waypoint. The data in the flight level (FL) field 210 may comprise a vertical axis 213, and time in minutes may comprise a horizontal axis 216. Each point 218 on the second GUI 86*b* comprises the ATA at that particular flight level corresponding to the waypoints 206. A first whisker 218*a* indicates the minimum difference in the estimated ETA for that waypoint and a second whisker 218*b* indicates the maximum difference in the estimated ETA for that waypoint. The points 218 may be connected by a line, if desired.

Figure 11:
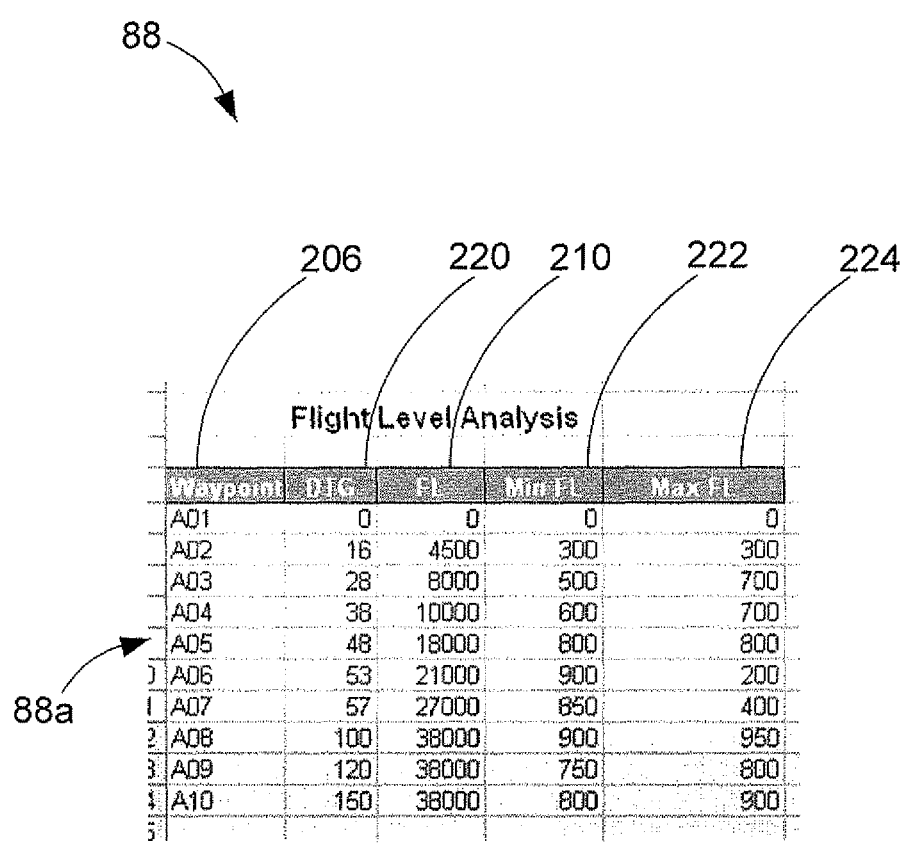
FIG. 11 illustrates an exemplary estimated vs. actual flight level analysis data screen.
Figure 12:
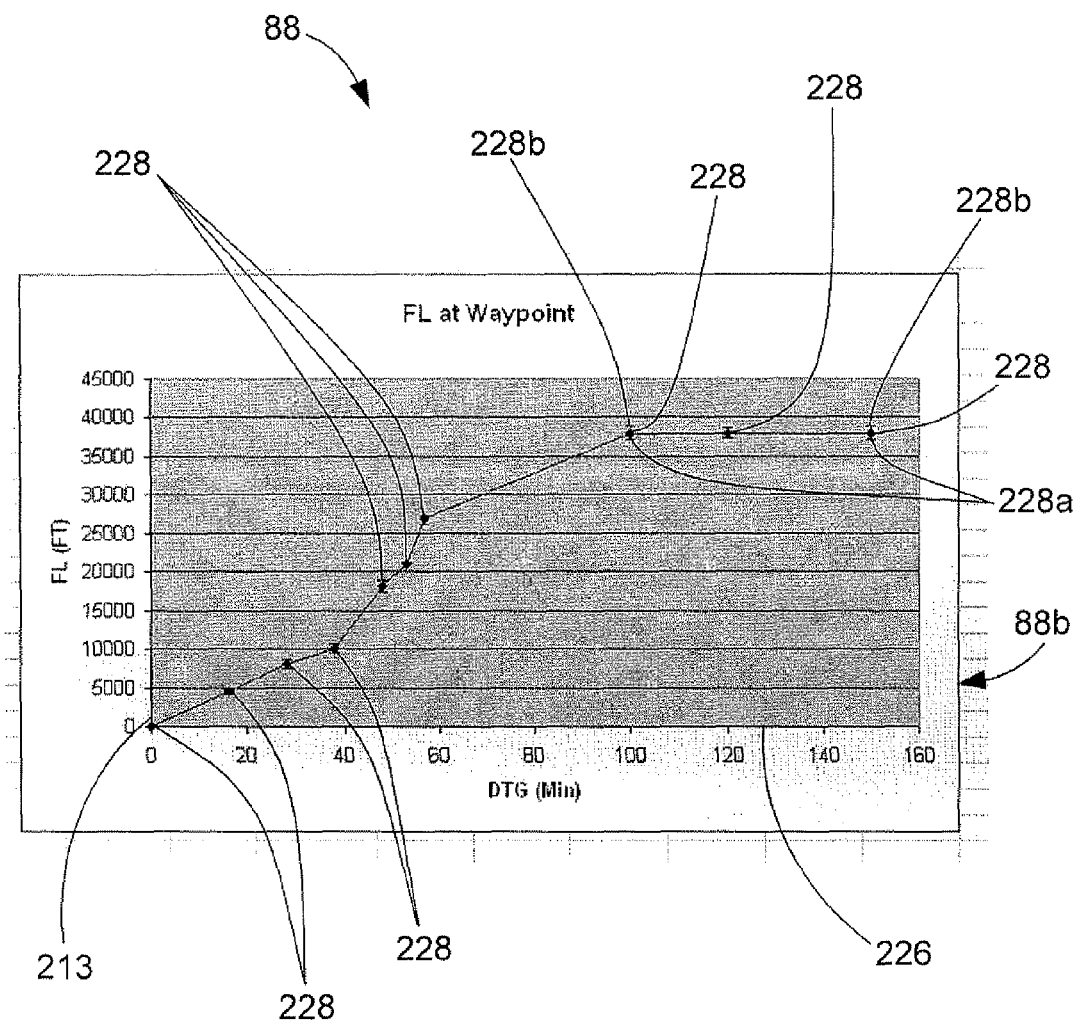
FIG. 12 illustrates an exemplary "FL at Waypoint" screen.

With reference back to FIG. 7, if the comparison of reported flight levels selector 188 is selected, then the comparison flight level GUI 88 is populated and displayed as shown in FIGS. 11 and 12. The comparison flight level GUI 88 may comprise a first GUI 88*a* (FIG. 11) that includes, in a tabular format, analysis data, and a second GUI 88*b* (FIG. 12) that includes, in a graphical format, a comparison of the flight level at the particular waypoints. The first GUI 88*a* and second GUI 88*b* could be a single comparison flight level GUI 88, or the second GUI 88*b* could be located within the first GUI 88*a*. As shown in FIG. 11, the first GUI 88*a* may have the following fields: waypoint 206, distance to go (DTG) 220, flight level (FL) 210, minimum FL difference 222 and maximum FL difference 224. The fields may be populated by the analysis data 70, with the estimated flight level data provided by the predicted route data 32, intermediate projected intent data 36 and the fixed projected intent of operation data 40, and the basic operation data 44 providing the actual flight level for the associated waypoints 206.

With reference to FIG. 12, the second GUI 88*b* may graphically illustrate the flight level (FL) at the particular waypoint. The data in the flight level (FL) field 210 may comprise the vertical axis 213, and the DTG in minutes may comprise a horizontal axis 226. Each point 228 on the second GUI 88*b* comprises the flight level at that particular DTG corresponding to the waypoints 206. A first whisker 228*a* indicates the minimum difference in the estimated flight level for that waypoint 206 and a second whisker 228*b* indicates the maximum difference in the estimated flight level for that waypoint 206. The points 228 may be connected by a line, if desired.

With reference back to FIG. 7, if the winds selector 190 is selected, then the wind GUI 90 is populated and displayed as shown in FIGS. 13-16. The wind GUI 90 may comprise a first GUI 90*a* (FIG. 13) that includes, in a tabular format, wind magnitude analysis data expressed in knots, a second GUI 90*b* (FIG. 14) that includes, in a tabular format, wind direction analysis data, a third GUI 90*c* (FIG. 15) that includes, in a graphical format a comparison of the wind speed to the flight level and a fourth GUI 90*d* (FIG. 16) that includes, in a graphical format, a comparison of the direction of the wind to the flight level. The first GUI 90*a*, second GUI 90*b*, third GUI 90*c* and fourth GUI 90*d* could comprise a single wind GUI 90, or the third GUI 90*c* and fourth GUI 90*d* could be located within the first GUI 90*a*, and/or the second GUI 90*b* could be located within the first GUI 90*a*.

Figure 13:
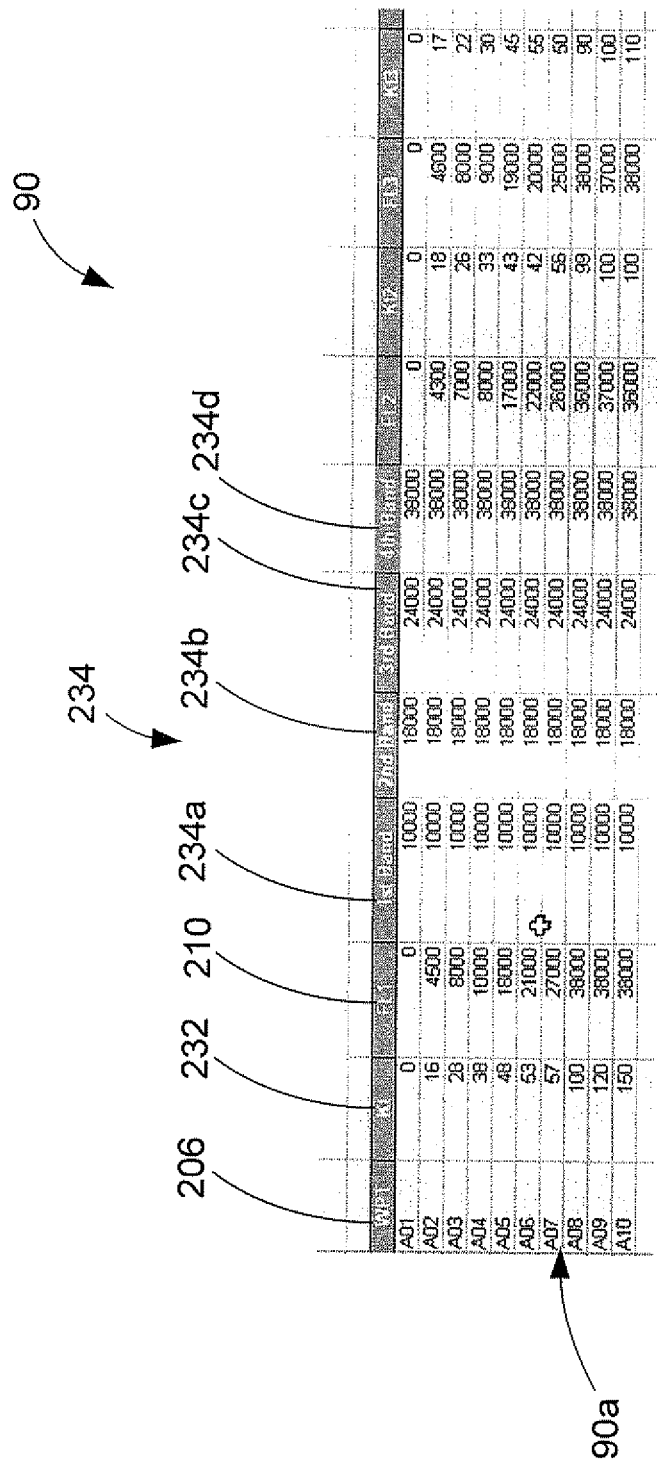
FIG. 13 illustrates a first exemplary wind data screen.
Figure 14:
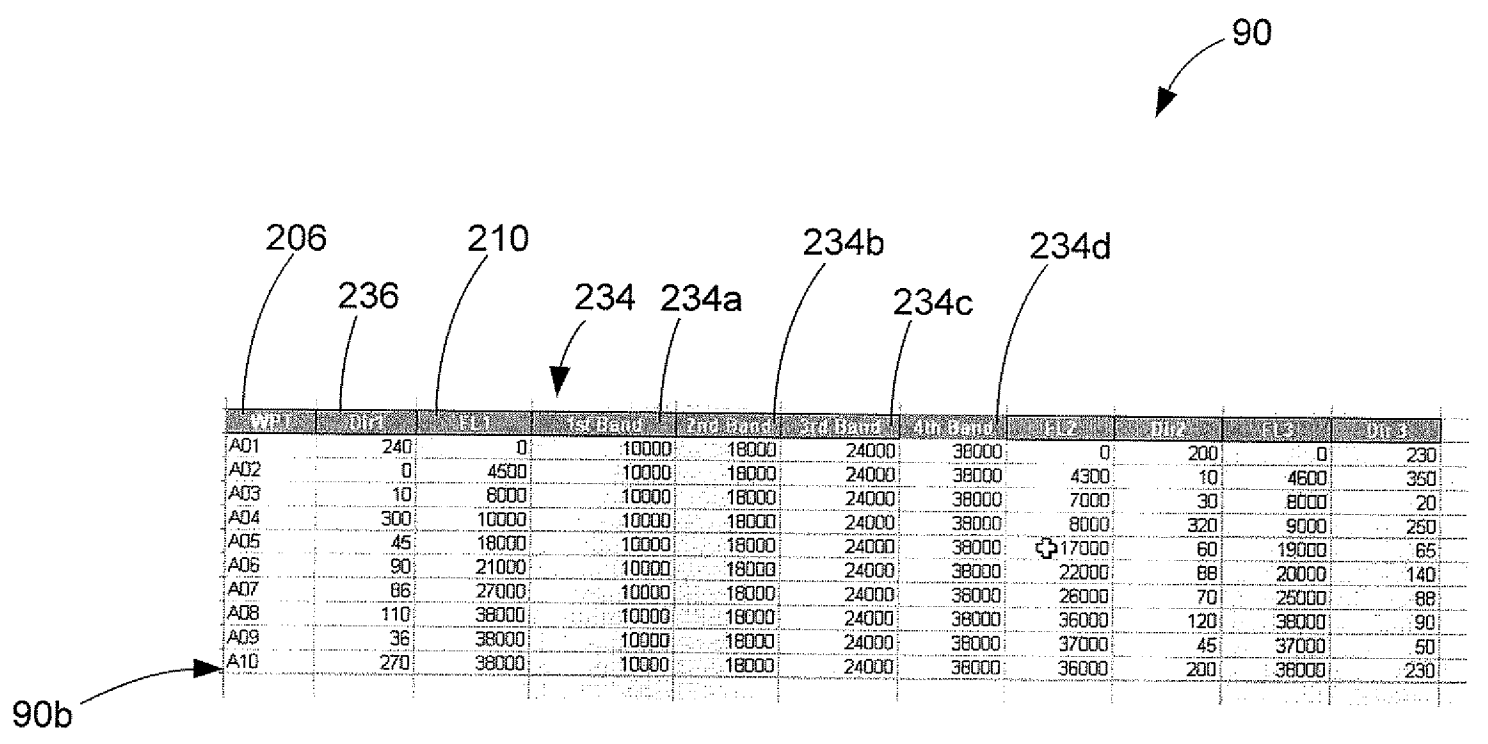

As shown in FIG. 13, the first GUI 90*a* may display the wind velocity in knots for all flights within a period specified by a wind analysis GUI 233 (FIG. 17), as will be discussed. The first GUI 90*a* may have the following populated fields: waypoint 206, knots 232, flight level (FL) 210 and wind band data 234 for the first wind band 234*a*, second wind band 234*b*, third wind band 234*c* and fourth wind band 234*d* for all flights within the specified period. The fields may be populated by the analysis data 70, with the estimated flight level data provided by the air reference data 46 and the basic operation data 44. With reference to FIG. 14, the second GUI 90*b* may have the following populated fields: waypoint 206, direction 236, flight level (FL) 210 and wind band data 234 for the first band 234*a*, second band 234*b*, third band 234*c* and second band 234*d*. The fields may be populated by the analysis data 70, with the estimated flight level data provided by the air reference data 46 and the basic operation data 44.

Figures 15, 16:
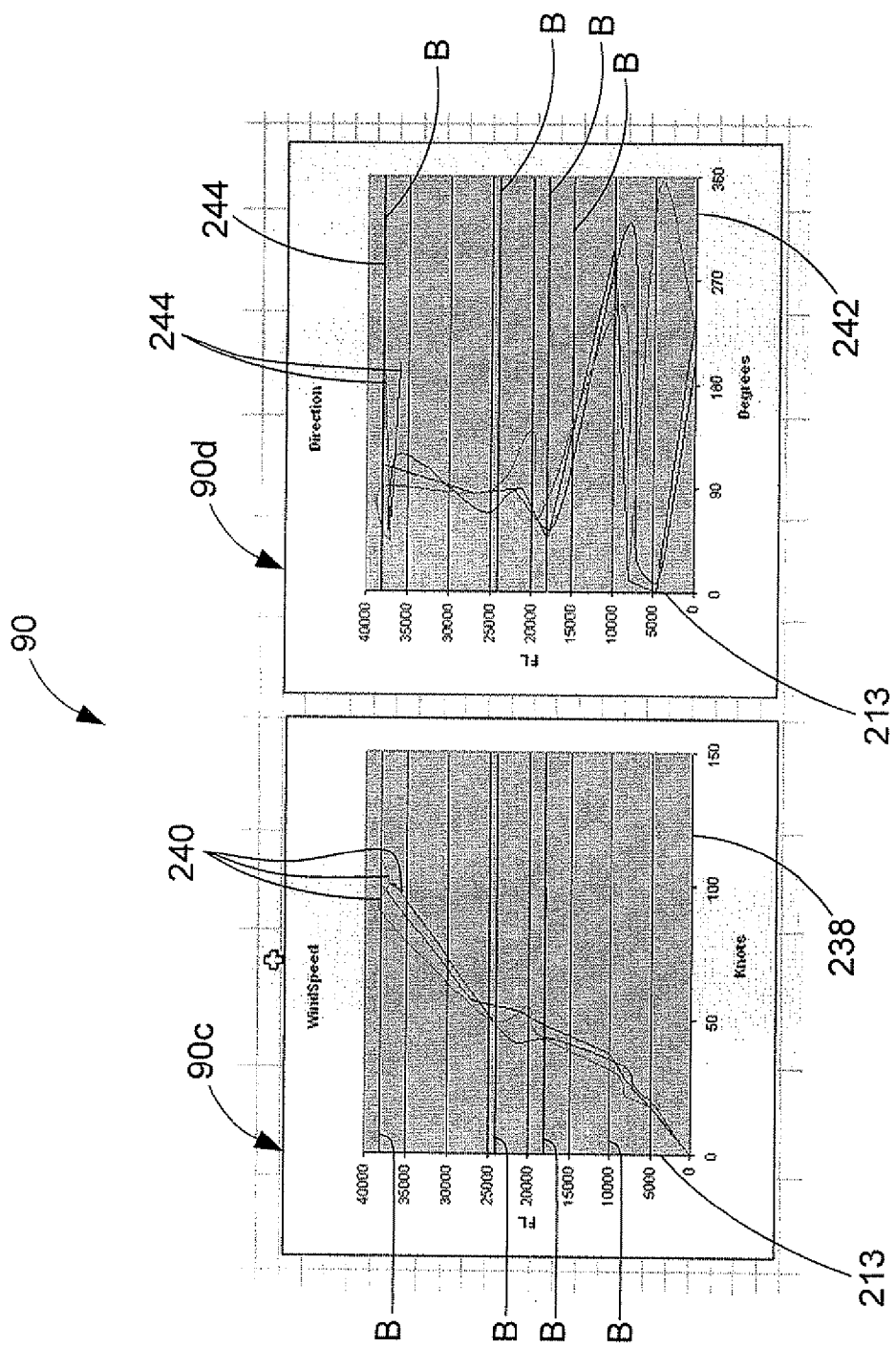
FIG. 15 illustrates an exemplary "Windspeed" screen.
FIG. 16 illustrates an exemplary "Direction" screen.

With reference to FIG. 15, the third GUI 90*c* may graphically illustrate the wind speed in knots at a particular flight level. The data in the flight level (FL) field 210 may comprise the vertical axis 213, and the data in the knots field 232 may comprise a horizontal axis 238. Each line 240 on the third GUI 90*c* provides an indicator of the wind speed encountered by that particular aircraft 16 during the operation of that aircraft 16 at that particular flight level. Similarly, with reference to FIG. 16, the fourth GUI 90*d* may graphically illustrate the wind direction in speed at a particular flight level. The data in the flight level (FL) field 210 may comprise the vertical axis 213, and the data in the direction field 236 may comprise a horizontal axis 242. Each line 244 on the fourth GUI 90*d* provides an indicator of the wind direction in degrees encountered by that particular aircraft 16 during the operation of that aircraft 16 at that particular flight level.

In each of the third GUI 90c and the fourth GUI 90d, the wind bands 234a-d defined in the wind analysis GUI 233 (FIG. 17) may also be illustrated as horizontal lines B. It will be understood that the lines 240, 242, B could be in color and keyed to facilitate the interpretation of the data displayed on the third GUI 90c and the fourth GUI 90d, and/or the first GUI 90a or second GUI 90b could include associated color coding in the fields relating to the flight that corresponds to the lines 240, 242 displayed on the third GUI 90c and the fourth GUI 90d.

Figure 17:
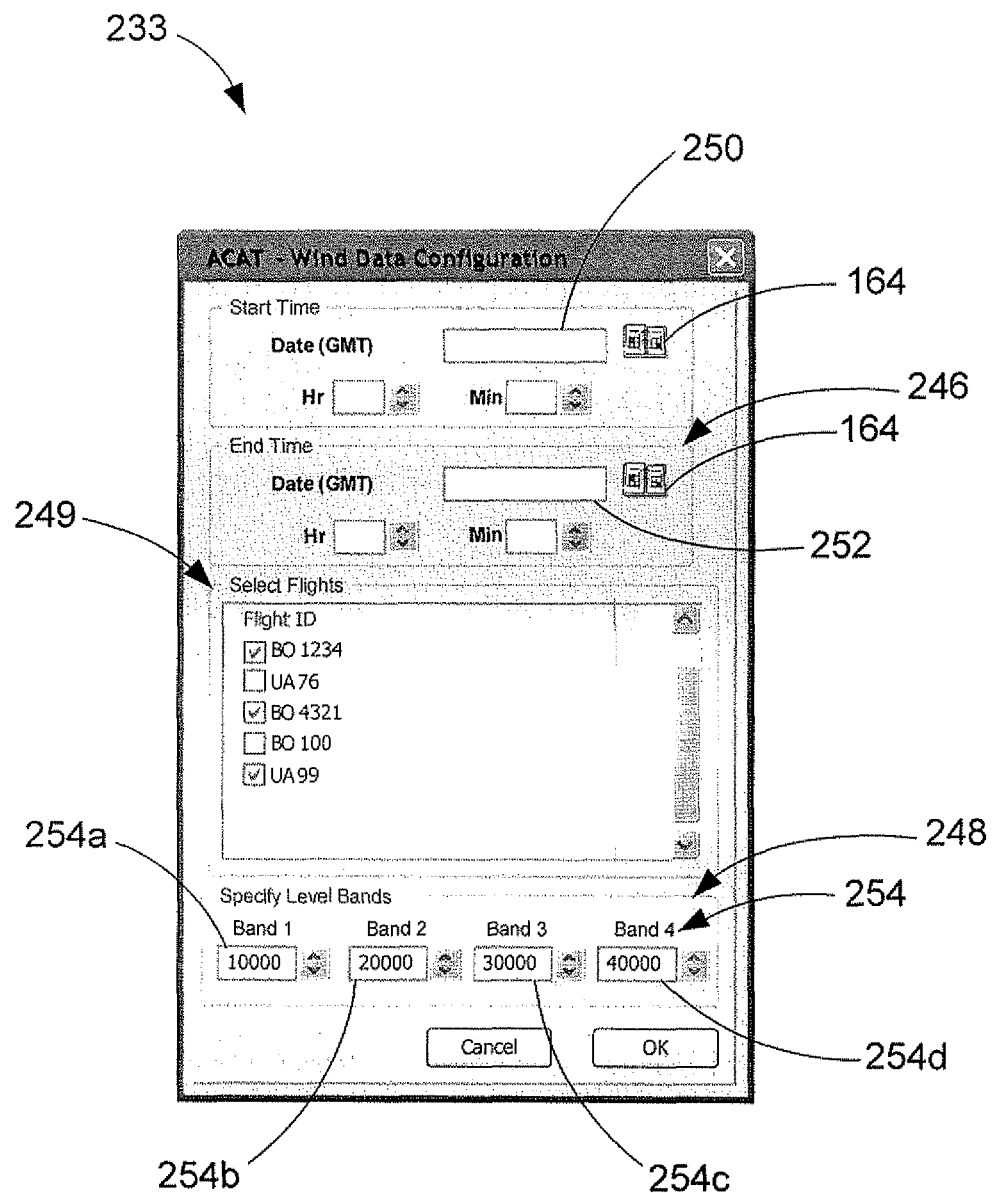
FIG. 17 illustrates an exemplary "Wind Analysis" input screen.

With reference now to FIG. 17, the wind analysis GUI 233 will be described in greater detail. The wind analysis GUI 233 may be generated by the selection of a "Wind Data" selector 235 on the export data GUI 82 (FIG. 7). The wind analysis GUI 233 includes a dates sub-menu 246, a level band sub-menu 248 and a select flights sub-menu 249. The dates sub-menu 246 enables the user to select a date range and a time period to analyze, and may include an initial date selector 250 and an end date selector 252. The initial data selector 250 enables the entering of the start date and time for the analysis, while the end date selector 252 enables the entering of the end date and time for the analysis. Calendars 164 may also be included to facilitate the inputting of a date and time. The select flights sub-menu 249 enables the selection of one or more particular flights for analyzing the collected wind data. The level band sub-menu 248 enables the user to define specific wind bands for analysis, with each wind band corresponding to a particular level above sea level desired for analysis. The level band sub-menu 248 includes band selectors 254. Generally, the level band sub-menu 248 includes four band selectors 254a-d, however, any number of band selectors 254 could be employed.

Figure 18:
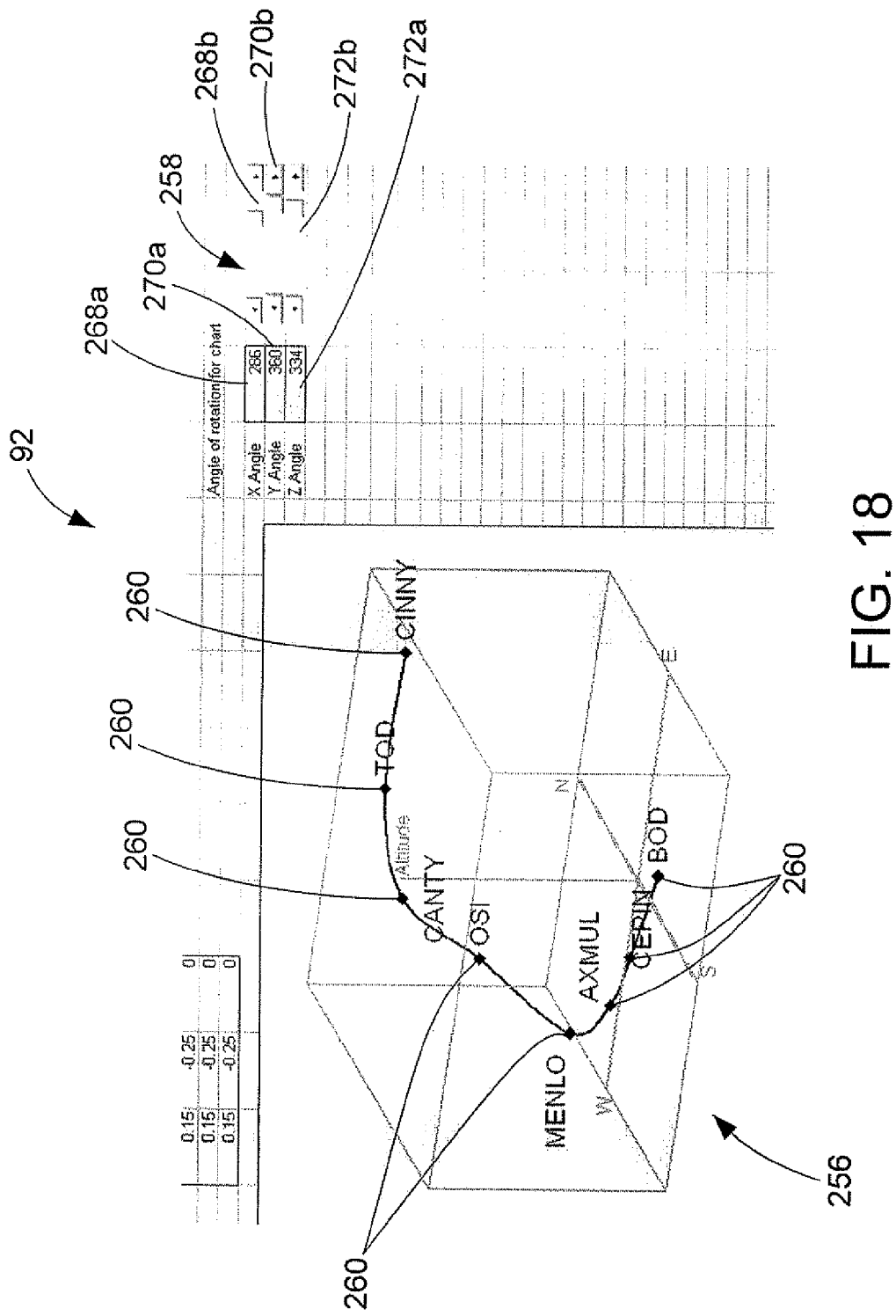
FIG. 18 illustrates an exemplary 4-dimensional aircraft track plot screen.

With reference back to FIG. 7, if the 4D aircraft track plot selector 192 is selected, then the 4D aircraft track GUI 92 is populated and displayed as shown in FIG. 18. The 4D aircraft track GUI 92 may include a graphical representation 256 of the flight path of the aircraft 16 and/or a tabular format 258 that may enable the manipulation of the graphical representation. Generally, the graphical representation 256 includes a 4-dimensional representation of the projected position of the aircraft 16 against the actual position of the aircraft 16 at waypoints 260, plotted against distance, and including a lateral deviation for the aircraft 16 as it passes through the waypoints 260. The waypoints 260 may be defined in a waypoint GUI 264 (FIG. 19), as will be discussed in greater detail. The projected position of the aircraft 16 may be provided by the predicted route data 32 and the intermediate projected intent data 36. The actual position of the aircraft 16 may be provided by the basic operation data 44. The lateral deviation may be determined by computing the difference between the actual position of the aircraft 16 at the waypoint 260 and the position of the waypoint 260. Generally, the waypoints 260 selected in the waypoint GUI 264 are the waypoints 260 emphasized in the graphical representation 256.

Figure 19:
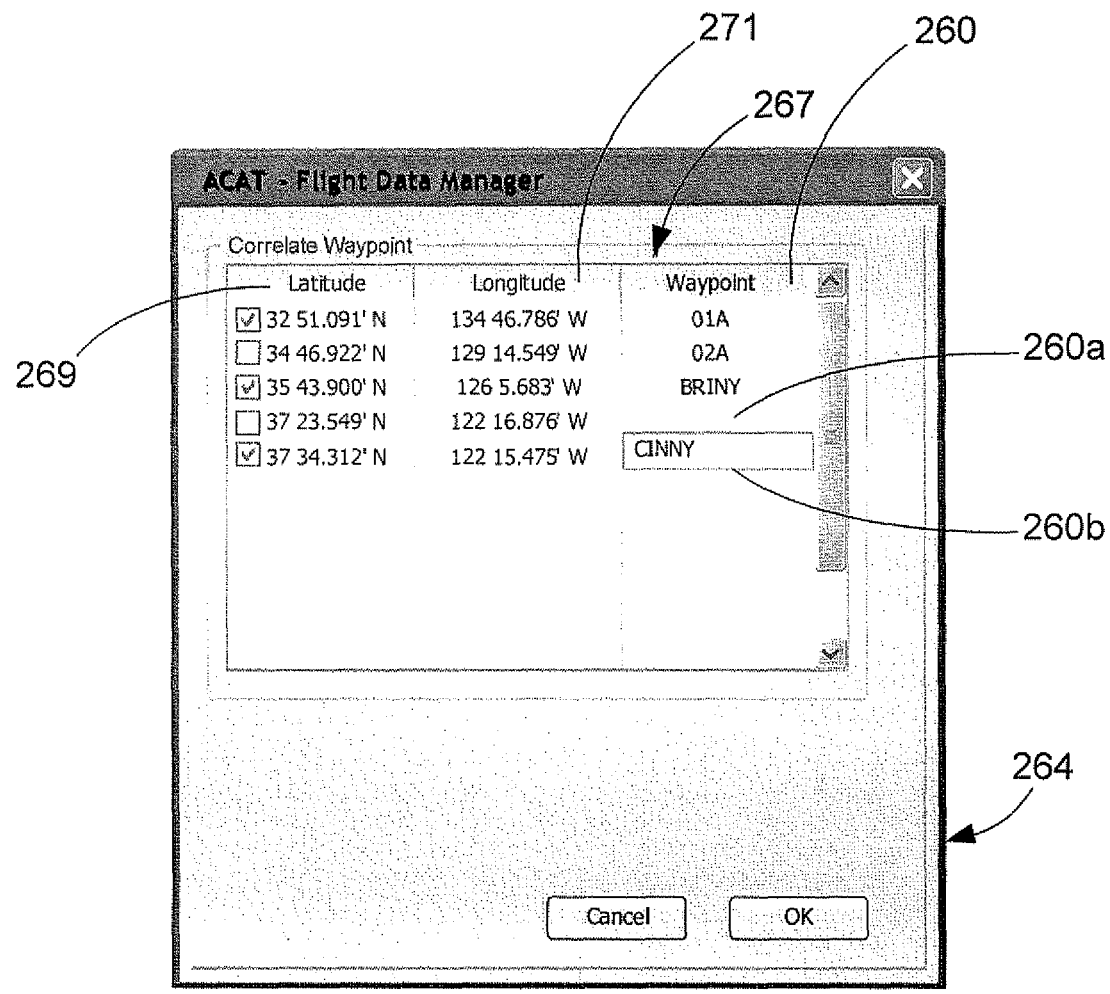
FIG. 19 illustrates an exemplary "Flight Data Manager" screen for managing the waypoints analyzed.

With reference to FIGS. 7 and 19, the waypoint GUI 264 is populated upon the selection of a "Manage Waypoints" selector 265 (FIG. 7). The waypoint GUI 264 includes a correlate waypoint menu 267 that includes the following populated fields: latitude 269, longitude 271 and waypoint 260. The latitude 269 and longitude 271 may be populated from the predicted route data 32 and the intermediate projected intent data 36. In addition, a name for the waypoint 260 may be populated from the predicted route data 32 and the intermediate projected intent data 36, if known. If the waypoint 260 is not known, such as waypoint 260a, then the selection of the empty waypoint 260a will prompt a text box 260b for the entry of the waypoint 260.

With reference back to FIG. 18, the tabular format 258 enables the manipulation of the graphical representation 256 with respect to the x-axis, y-axis and z-axis. For example, the tabular format 258 may define an "X-angle" text box 268a and/or "X-angle" scroll bar 268b, a "Y-angle" text box 270a and/or "Y-angle" scroll bar 270b and a "Z-angle" text box 272a and/or scroll bar 272b. The text boxes 268a, 270a, 272a enable the entry of a specific rotation in degrees for the graphical representation 256, while the scroll bars 268b, 270b, 272b enable the user to quickly modify, via the user input device 17, the position of the graphical representation 256.

With reference back to FIG. 7, if the ARINC header extract selector 194 is selected, then the protocol headers from all the messages are extracted and key data such as the path each message took through the communications chain in FIG. 1 will be displayed. Trends in terms of the aircraft communications servers 14 and specific data links 20 and data link components such as VHF ground stations or satellite Ground Earth Stations will be identified and displayed. This analysis allows the user to analyze trends in e.g. communications systems performance and potentially malfunctioning components. Further, if the message assurance data selector 196 is selected, then the technical acknowledgements for messages will be analyzed, and observations such as transit time through the network and sub-networks may be displayed in tabular or graphical format.

Referring to FIG. 7, the export target selector 174, enables the specification of a file path to export the analysis data 70 to. The file path can be entered into the text box 174a, or could be defined through a "Browse" selector 174b that prompts the user to locate the desired file path, as is generally known in the art. The cancel selector 176, when selected, closes the export data GUI 82 without saving any selections, and the export selector 178, when selected, validates the selections and exports the analysis data 70 to the file path according to the selections.

Figure 20:
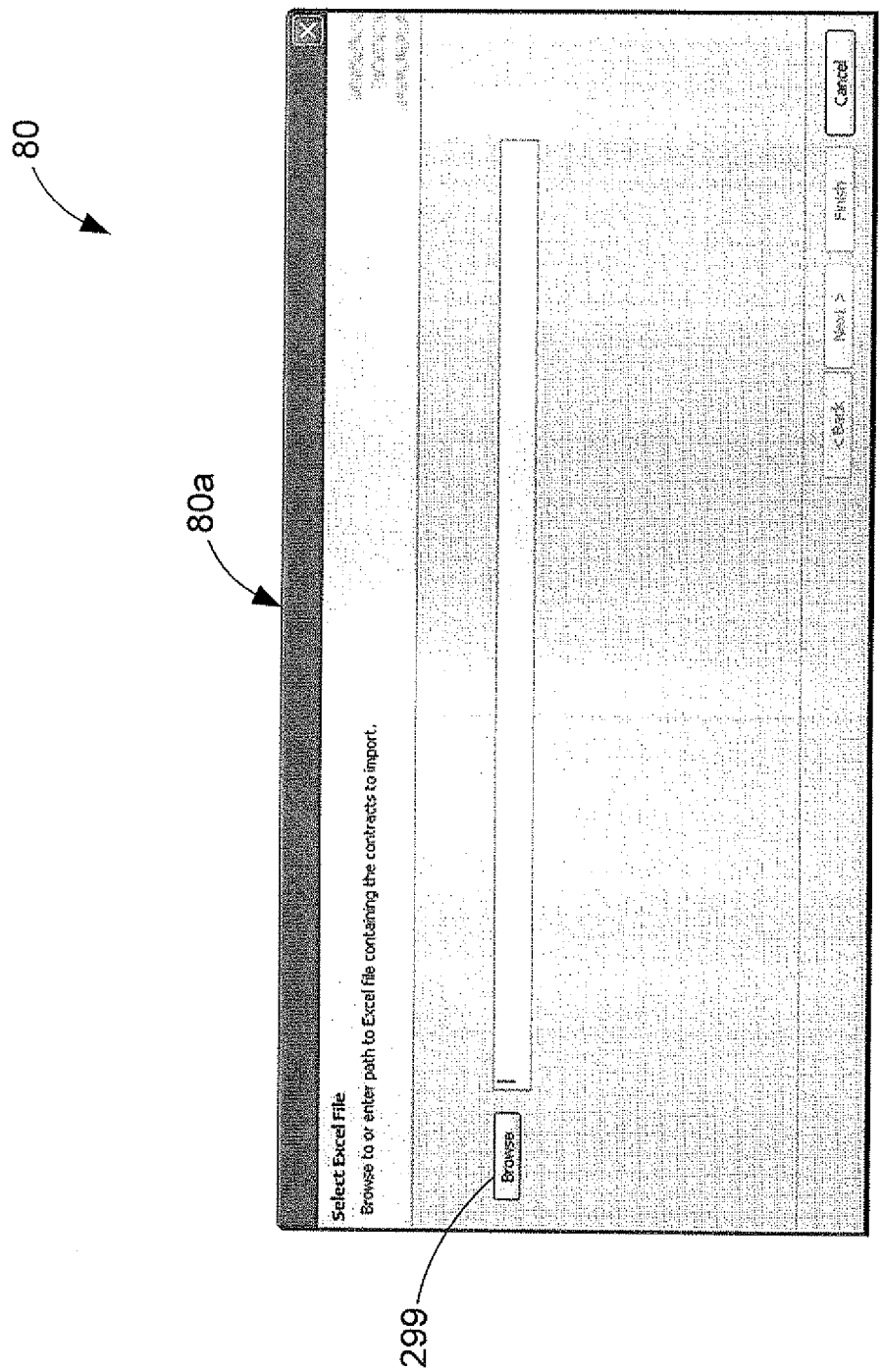
FIG. 20 illustrates a first exemplary import screen.
Figure 21:
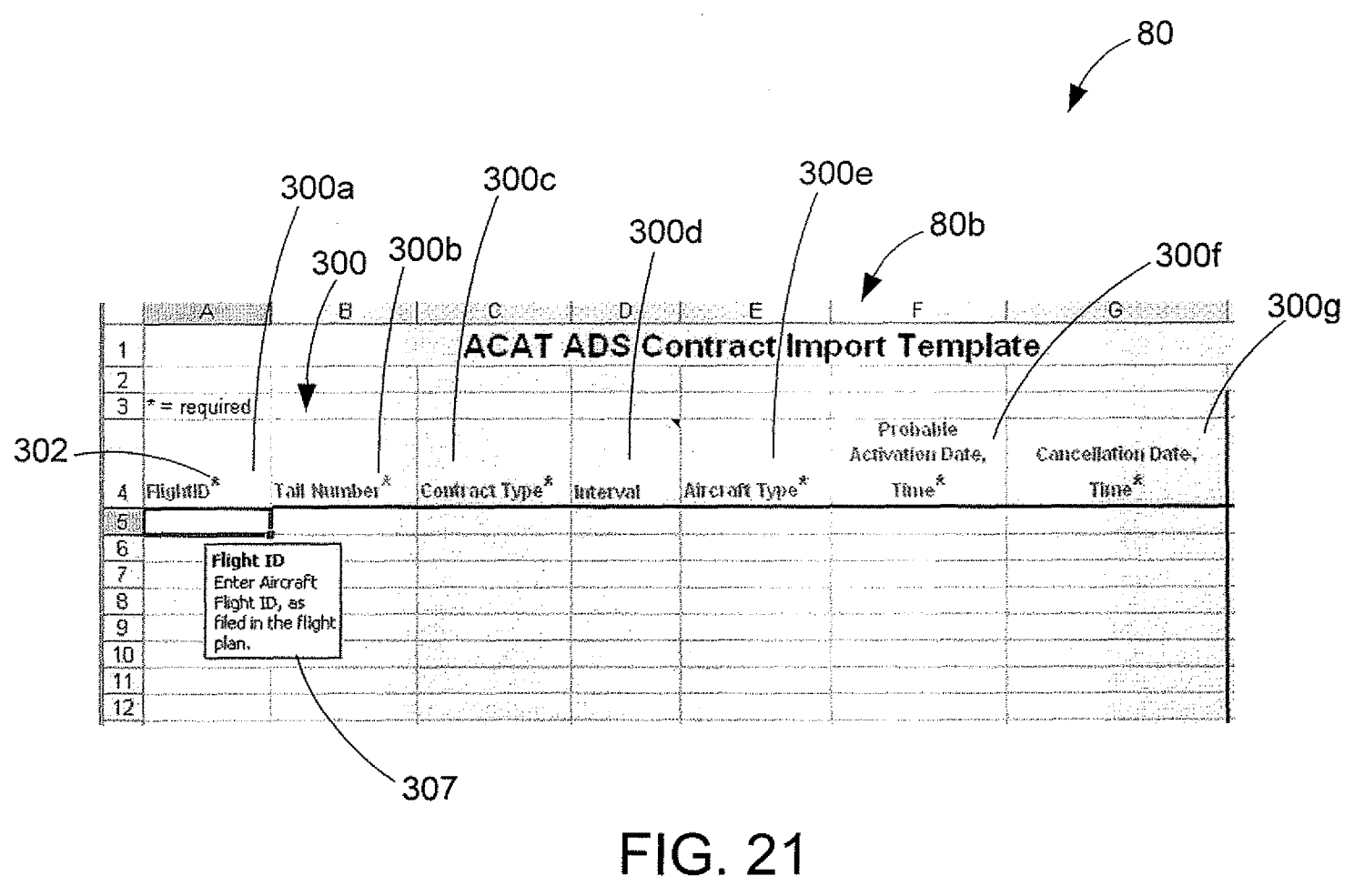
Figure 22:
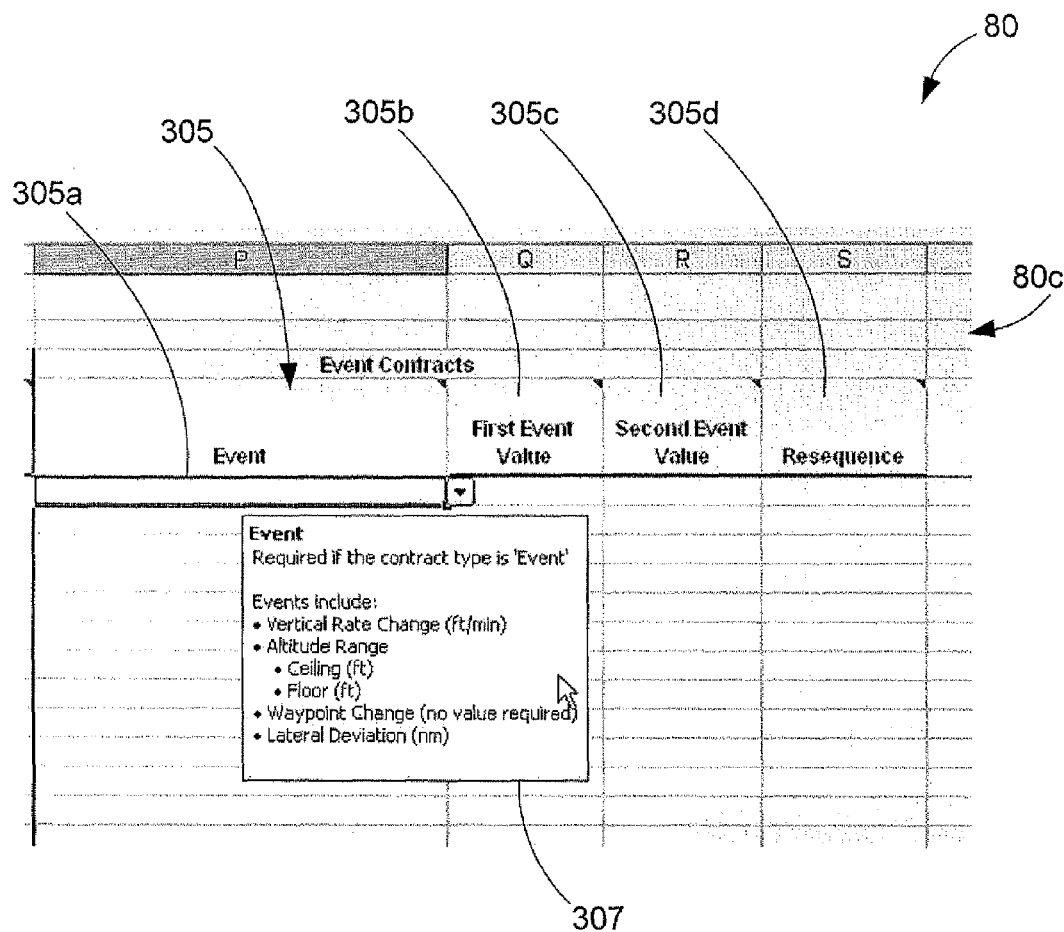
FIG. 22 illustrates a third exemplary import screen.
Figure 23:
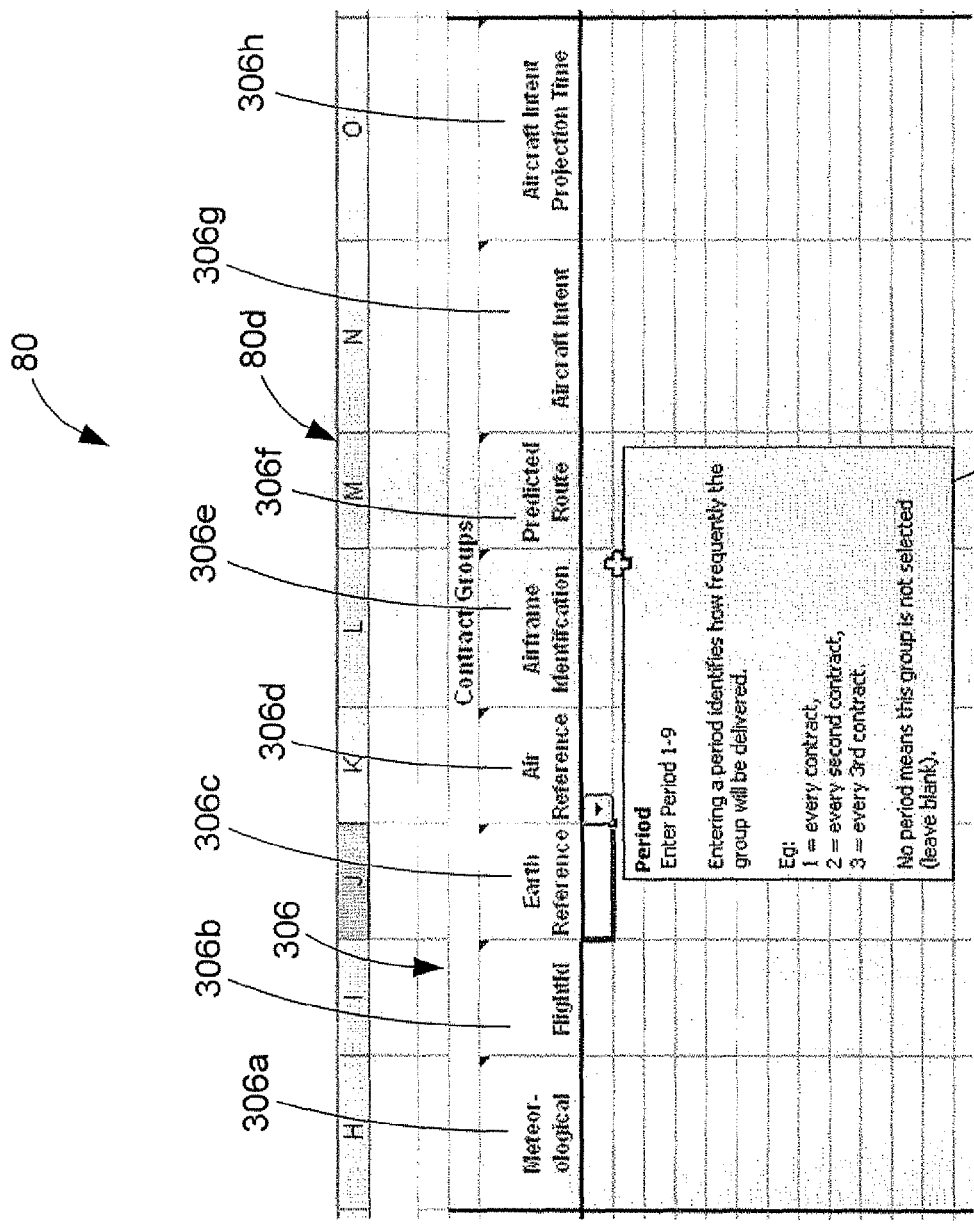
FIG. 23 illustrates a fourth exemplary import screen.

With reference back to FIG. 5, the import contracts selector icon 96i, when selected, prompts the GUI manager module 26 to output the import GUI 80, as shown in FIGS. 20-24. The import GUI 80 may include a first GUI 80a, a second GUI 80b, a third GUI 80c, a fourth GUI 80d and a fifth GUI 80e. With reference to FIG. 20, the first GUI 80a may include instructions for selecting a file containing a contract to import and may include selectors, such as "Browse" 299, to assist in the location of the file. The file to import generally may be in a tabular format, and may be created from data entered into the second GUI 80b, third GUI 80c and fourth GUI 80d, as shown in FIGS. 21-23.

With reference now to FIG. 21, the second GUI 80b may be used to create the file for importing into the create contract GUI 78. The second GUI 80b includes, in tabular format, the following fields 300 that may be populated by the user: "FlightID" 300a, "Tail Number" 300b, "Contract Type" 300c, "Interval" 300d, "Aircraft Type" 300e, "Probable Activation Date, Time" 300f and "Cancellation Date, Time" 300g. As each of the fields 300 may be populated with the same data discussed with regard to the create contract GUI 78, these fields 300 will not be discussed in detail herein. Briefly, however, if the "Contract Type" 300c is specified, then the third GUI 80c is populated and displayed. With reference now to FIG. 22, the third GUI 80c is shown. The third GUI 80c may include, in tabular format, the following fields 305 that may be populated by the user: "Event" 305a, "First Event Value" 305b, "Second Event Value" 305c and "Resequence" 305d. As each of the fields 305 may be populated with the same data discussed with regard to the create contract GUI 78, these fields 305 will not be discussed in detail herein. The third GUI 80c may also include the pop-up text box 307 that includes instructions for the data required to populate the particular field.

With reference back to FIG. 21, the second GUI 80b may include indicators, such as a star 302, to denote that the field is required to be populated in order to constitute a completed contract. The second GUI 80b may also include the pop-up text box 307 that includes instructions for the data required to populate the particular field.

With reference now to FIG. 23, the fourth GUI 80d may be used along with the second GUI 80b and the third GUI 80c to create the file for importing into the create contract GUI 78. The fourth GUI 80d includes, in tabular format, the following fields 306 that may be populated by the user: "Meteorological" 306a, "FlightID" 306b, "Earth Reference" 306c, "Air Reference" 306d, "Airframe Identification" 306e, "Predicted Route" 306f, "Aircraft Intent" 306g and "Aircraft Intent Projection Time" 306h. As each of the fields 306 may be populated with the same data discussed with regard to the create contract GUI 78, these fields 306 will not be discussed in detail herein. The fourth GUI 80d may also include a pop-up text box 308 that includes instructions for the data required to populate the particular field.

Once the second GUI 80b, third GUI 80c and fourth GUI 80d have been populated, the data inputted into the second GUI 80b, third GUI 80c and fourth GUI 80d may be collected and saved into a single file. This file may be imported using the first GUI 80a, as shown in FIG. 20. After the file is selected using the "Browse" selector 299, a "Next" selector 310 may be selected. When the "Next" selector 310 is selected, the fifth GUI 80e is populated.

Figure 24:
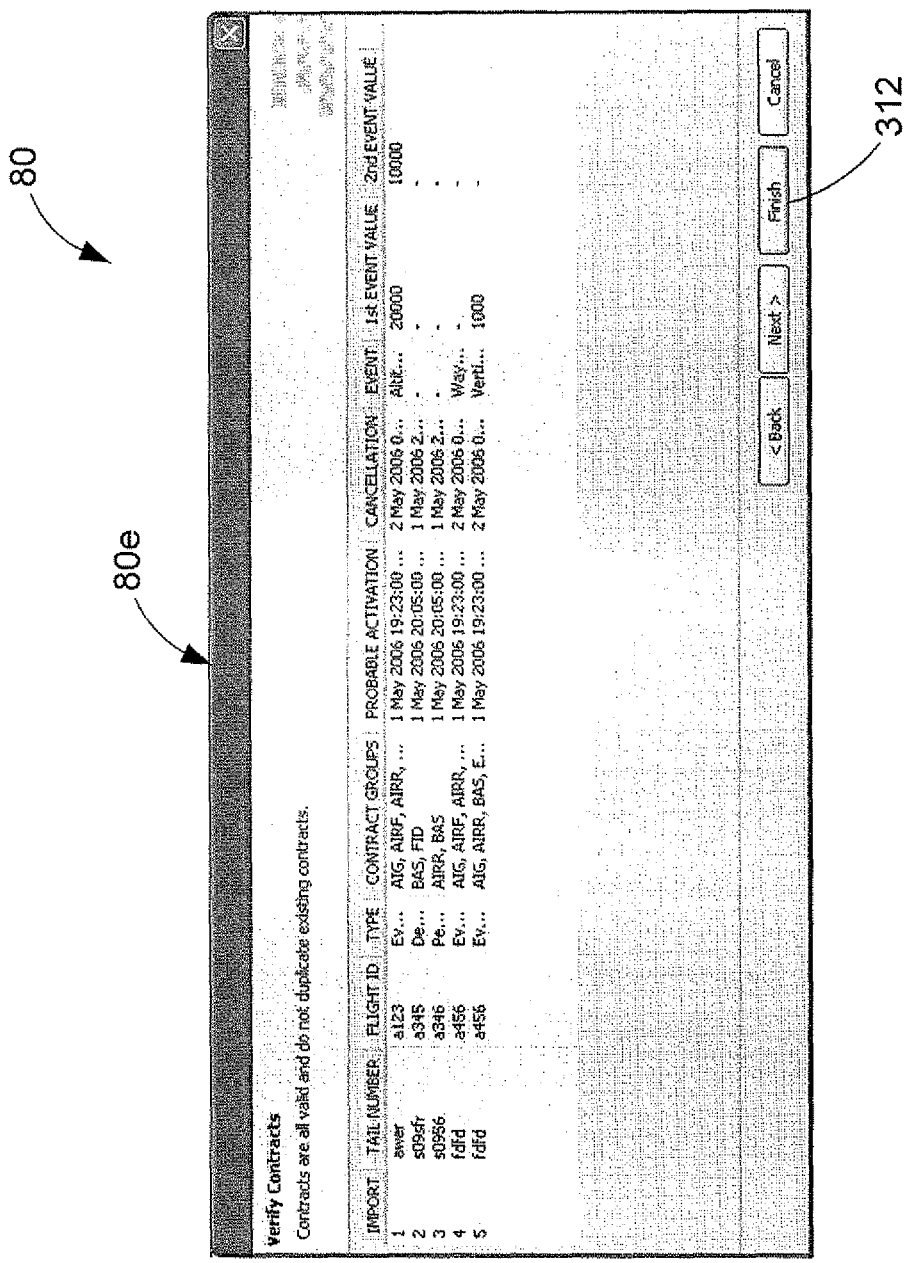
FIG. 24 illustrates a fifth exemplary import screen.

With reference to FIG. 24, the fifth GUI 80e is shown. The fifth GUI 80e may include in tabular format the file(s) selected for importing into the contract management GUI 76. The fifth GUI 80e may also include text instructing the user to verify that the imported contracts do not duplicate existing contracts. If the contracts 100 illustrated in the fifth GUI 80e are satisfactory, then "Finish" 312 may be selected. When "Finish" 312 is selected, the GUI manager module 26 may populate the contract management GUI 76 with the imported data to result in a list of contract(s) 100 as shown in FIG. 5.

Figure 25:
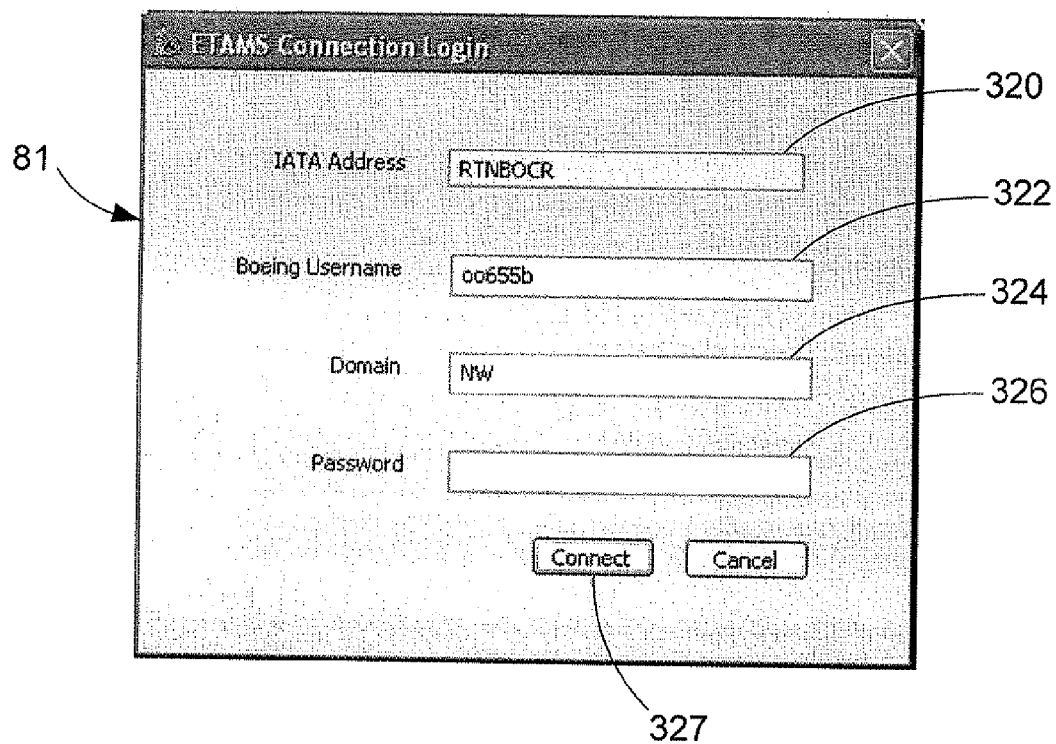
FIG. 25 illustrates an exemplary "Connection Login" screen.

With continuing reference to FIG. 5, the connect selector icon 96j, when selected, prompts the GUI manager module 26 to output the log-in GUI 81, as shown in FIG. 25. With reference to FIG. 25, the log-in GUI 81 may include an "Address" box 320, a "Username" box 322, a "Domain" box 324 and a "Password" text box 326. The "Address" box 320, "Username" box 322 and "Domain" text box 324 may be pre-populated by the GUI manager module 26 based on the registry settings of the computer 17. The "Password" text box 326 enables the user to enter their password such that the user may log-on to the software 19 to enable the creation of the contracts 100. When the password is entered, a "Connect" selector 327 may be selected to connect the user to the aircraft communication server 14. When the user is connected to the aircraft communication server 14, the user may enable any selected contract 100.

Figure 26:
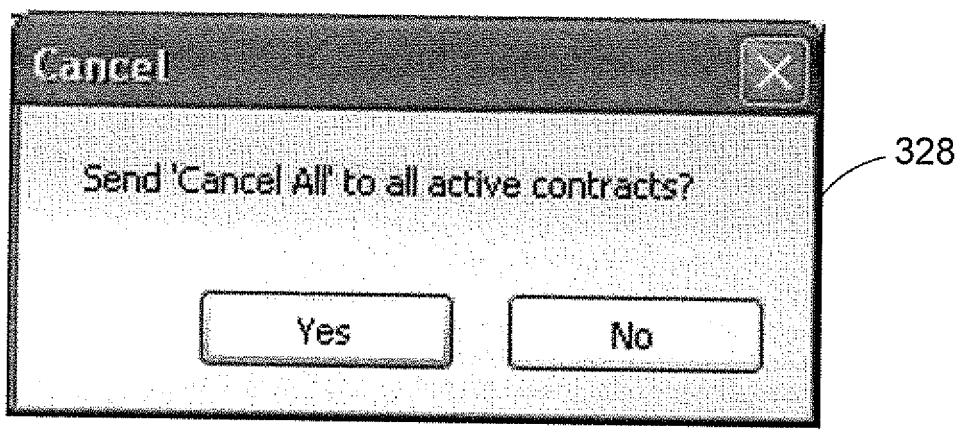
FIG. 26 illustrates an exemplary "Cancel" screen.

With reference to FIG. 5, the log-off selector icon 96k, when selected, prompts the GUI manager module 26 to output a GUI (not shown) to verify that the user wants to log-off the software 19. In addition, the GUI manager module 26 may output a cancellation GUI 328, as shown in FIG. 26. With reference to FIG. 26, the cancellation GUI 328 may include instructions to enable a user to decide if they want to cancel all active contracts upon logging-off of the system 10.

With reference to FIG. 5, the contract management GUI 76 also includes the tabular data identifiers 98 that are populated with data regarding the contracts 100, if they exist. The tabular data identifiers 98 may include the following fields 330 that may be populated by data regarding the particular contract 100: "Contract Number" 330a, "Tail Number" 330b, "Flight Identification" 330c, "Contract Type" 330d, "Contract Group" 330e, "Initialized" 330f, "Last Update" 330g, "Next Update" 330h and "Status" 330i.

The "Contract Number 330a includes a numeric identifier for each created contract 100. The "Tail Number" 330b includes the tail number associated with the contract 100 entered during the population of the create contract GUI 78. The "Flight Identification" 330c includes the flight identification associated with the contract 100 entered during the population of the create contract GUI 78, and the "Contract Type" 330d includes the data regarding the contract type selected in the create contract GUI 78. The "Contract Group" 330e comprises a listing of the types of data 30 selected for collection on the contract sub-menu 116 of the create contract GUI 78. The "Initialized" 330f field comprises data including the time and date that the particular contract 100 was created through the create contract GUI 78. The "Last Update" 330g field comprises time and date data regarding when the data collected by the contract 100 was last gathered from the aircraft 16, while the "Next Update" 330h field indicates the next time and date that the data collected by the contract 100 will be gathered from the aircraft 16.

The "Status" 330i field includes the current status of the contract 100. The "Status" 330i may include one of "Created," "Enabled," "Active," "Enabled (Expired)," "Cancelled-Pending," "Cancelled-Sent," "Expired," "NCP," "Error" or "Emergency." The status of "Created" denotes that the contract 100 is initiated in the system 10, but not yet enabled, while the status of "Enabled" denotes that the system 10 is prepared to connect with the aircraft 16 via the aircraft communication server 14 to activate this contract 100 according to the activation time or triggering event for that contract. The status of "Active" denotes that the aircraft 16 has accepted the contract 100 from the aircraft communication server 14. Contracts 100 with a status of "Active" may also be highlighted in green in the contract management GUI 76. The status of "Enabled (Expired)" denotes that the contract 100 has been enabled but has a cancellation time that is past the current time. The status of "Cancelled-Pending" denotes that the contract 100 has an uplink 'cancel' message pending, but the 'cancel' message has not yet been sent to the aircraft 16 via the aircraft communication server 14. The status of "Cancelled-Sent" denotes that the contract 100 has an 'cancel' message that has been sent by the aircraft communication server 14 to the aircraft 16, and the status of "Expired" denotes that the probable cancellation time of the contract 100 is in the past, and the contract 100 has not yet been enabled.

The status of "NCP" indicates that the aircraft 16 is non-compliant with all or part of the contract 100, such as if the aircraft 16 indicated that it was unable to provide some or all the requested data associated with the requested contract. The "Error" status is assigned to any other unexplained error associated with an uplink or downlink message to or from the aircraft 16, and the "Emergency" status indicates that the aircraft 16 has changed the contract 100 to an emergency contract 100. A contract 100 may have an "Emergency" status when the aircraft 16 has entered emergency status. As a result of an aircraft 16 going into emergency status, any active contract with that aircraft 16 will be converted into an emergency contract, a periodic contract with a short interval and an indication in each report that the aircraft 16 is in an emergency. In addition, the contract 100 that has an "Emergency" status may be highlighted in red in the contract management GUI 76.

The contract management GUI 76 also includes a connection indicator 102 and a time, date or time-date stamp 104. The connection indicator 102 displays the status of the connection to the uplink server 1, such as "Connected" or "Not Connected." The time, date or time-date stamp 104 may display any combination of the current time or date for the user.

Thus, the software 19 enables the user to initiate data requests or contracts well in advance of the flight of the particular aircraft 16, and therefore, allows flexible collection with reduced workload for the ground system user, and elimination of all burdens on ANSP systems and operational staff, which are no longer required to collect the data. In addition, the software 19 enables the user to collect data that was previously unobtainable without the help of the ANSP staff. Further, the software 19 enables the user to work offline and independent from the ANSP staff, and thus, does not require modifications be made to the ANSP operating systems. The software 19 also enables the user to analyze and view the data collected, which may be used to diagnose factors that result in delays in the arrival of the aircraft 16, and assess methods designed to reduce fuel burn and emissions for aircraft, and increase predictability for ground systems seeking to increase capacity through increased accuracy of aircraft 16 predictions While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, the mixing and matching of features, elements and/or functions between various examples is expressly contemplated herein so that one of ordinary skill in the art would appreciate from this disclosure that features, elements and/or functions of one example may be incorporated into another example as appropriate, unless described otherwise, above. Moreover, many modifications can be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out this disclosure, but that the scope of the present disclosure will include any embodiments falling within the foregoing description and the appended claims.

What is claimed is:

1. A system for remotely collecting and analyzing Automatic Dependent Surveillance-Contract (ADS-C) data generated by an aircraft while the aircraft is airborne, without the use of an Air Navigation Service Provider (ANSP), the system comprising:
    one or more computer processors; and
    a memory containing computer program code that, when executed by operation of the one or more computer processors, performs an operation comprising:
        creating an event contract describing data to be collected from the aircraft and specifying a user-selected frequency interval at which the data is to be collected aboard the aircraft, wherein the contract specifies at least (i) one or more of a plurality of different types of aircraft from which data is to be collected, (ii) a plurality of data types regarding aircraft operation and real time meteorological information for which data is to be collected, (iii) at least one of a flight number associated with the aircraft and a tail number of the aircraft, (iv) at least one conditional statement that specifies one or more contracts and (v) a re-sequence selector defining a number of times the event contract is to be re-enabled after expiring;
        remotely requesting and collecting selected ADS-C data from at least one aircraft at the user-selected frequency interval, further comprising:
            upon determining the at least one conditional statement is satisfied by one or more reports from the specified one or more contracts, enabling the event contract;
        analyzing the collected selected ADS-C data and reporting the analyzed data in real-time; and
        outputting the analyzed data for display.

2. The system of claim 1 wherein the ADS-C contract data further comprises one of periodic contract data and demand contract data.

3. The system of claim 1, wherein the event contract further specifies an operating environment associated with the aircraft.

4. The system of claim 1, wherein remotely requesting and collecting selected ADS-C data from at least one aircraft at the user-selected frequency interval, further comprises:
    transmitting the event contract from a terrestrial-based computer system to the aircraft, while the aircraft is airborne, using an aircraft communication server communicatively coupled with the terrestrial-based computer system and configured to relay information between the terrestrial-based computer system and the aircraft.

5. A method for remotely collecting and analyzing Automatic Dependent Surveillance-Contract (ADS-C) data generated by an aircraft while the aircraft is airborne, without the use of an Air Navigation Service Provider (ANSP), the method comprising:
    creating an event contract describing data to be collected from the aircraft and specifying a user-selected frequency interval at which the data is to be collected aboard the aircraft, wherein the contract specifies at least (i) one or more of a plurality of different types of aircraft from which data is to be collected, (ii) a plurality of data types regarding aircraft operation and real time meteorological information for which data is to be collected, (iii) at least one of a flight number associated with the aircraft and a tail number of the aircraft, (iv) at least one conditional statement that specifies one or more contracts and (v) a re-sequence selector defining a number of times the event contract is to be re-enabled after expiring;
    remotely requesting and collecting selected ADS-C data from at least one aircraft at the user-selected frequency interval, further comprising:
        upon determining the at least one conditional statement is satisfied by one or more reports from the specified one or more contracts, enabling the event contract;
    analyzing, by operation of one or more computer processors, the collected selected ADS-C data and reporting the analyzed data in real-time; and
    outputting the analyzed data for display.

6. The method of claim 5 wherein the ADS-C contract data further comprises one of periodic contract data and demand contract data.

7. The method of claim 5, wherein the event contract further specifies an operating environment associated with the aircraft.

8. The method of claim 5, wherein remotely requesting and collecting selected ADS-C data from at least one aircraft at the user-selected frequency interval, further comprises:
relaying information between a terrestrial-based computer system and the aircraft while the aircraft is airborne, comprising:
receiving a plurality of contracts, each specifying a respective user-selected frequency interval at which the data is to be collected aboard the aircraft;
transmitting the plurality of contracts to an aircraft data collection module aboard the aircraft, wherein the aircraft data collection module is configured to collect data values as specified by the plurality of contracts to transmit the collected data values to be written to a data store.

9. The method of claim 5, wherein analyzing the collected selected ADS-C data and reporting the analyzed data in real-time further comprises:
retrieving stored ADS-C data from the aircraft while the aircraft is in flight for use in performing the real-time analysis of the collected data.

10. A non-transitory computer-readable medium comprising program code that, when executed, performs an operation for remotely collecting and analyzing Automatic Dependent Surveillance-Contract (ADS-C) data generated by an aircraft while the aircraft is airborne, without the use of an Air Navigation Service Provider (ANSP), the operation comprising:
creating an event contract describing data to be collected from the aircraft and specifying a user-selected frequency interval at which the data is to be collected aboard the aircraft, wherein the contract specifies at least (i) one or more of a plurality of different types of aircraft from which data is to be collected, (ii) a plurality of data types regarding aircraft operation and real time meteorological information for which data is to be collected, (iii) at least one of a flight number associated with the aircraft and a tail number of the aircraft, (iv) at least one conditional statement that specifies one or more contracts and (v) a re-sequence selector defining a number of times the event contract is to be re-enabled after expiring;
remotely requesting and collecting selected ADS-C data from at least one aircraft at the user-selected frequency interval, further comprising:
upon determining the at least one conditional statement is satisfied by one or more reports from the specified one or more contracts, enabling the event contract;
analyzing, by operation of one or more computer processors, the collected selected ADS-C data and reporting the analyzed data in real-time; and
outputting the analyzed data for display.

11. The non-transitory computer-readable medium of claim 10, wherein the ADS-C contract data further comprises one of periodic contract data and demand contract data.

12. The non-transitory computer-readable medium of claim 10, wherein the event contract further specifies an operating environment associated with the aircraft.

13. The non-transitory computer-readable medium of claim 10, wherein remotely requesting and collecting selected ADS-C data from at least one aircraft at the user-selected frequency interval, further comprises:
relaying information between a terrestrial-based computer system and the aircraft while the aircraft is airborne, comprising:
receiving a plurality of contracts, each specifying a respective user-selected frequency interval at which the data is to be collected aboard the aircraft;
transmitting the plurality of contracts to an aircraft data collection module aboard the aircraft, wherein the aircraft data collection module is configured to collect data values as specified by the plurality of contracts to transmit the collected data values to be written to a data store.

14. The non-transitory computer-readable medium of claim 10, wherein analyzing the collected selected ADS-C data and reporting the analyzed data in real-time further comprises:
retrieving stored ADS-C data from the aircraft while the aircraft is in flight for use in performing the real-time analysis of the collected data.

* * * * *